US012749379B2

(12) United States Patent
Wesson et al.

(10) Patent No.: US 12,749,379 B2
(45) **Date of Patent: *Sep. 29, 2026**

(54) AMUSEMENT SYSTEM FOR SKILL-BASED GAMES AND METHODS DIRECTED TO THE SAME

(71) Applicant: Savvy Dog Systems, LLC, Duluth, GA (US)

(72) Inventors: G. Lee Wesson, Naples, FL (US); Michael R. Pace, Hartwell, GA (US); Ian Fisch, Atlanta, GA (US); Christopher A. Cummings, Atlanta, GA (US)

(73) Assignee: Savvy Dog Systems, LLC, Duluth, GA (US)

(*) Notice: Subject to any disclaimer, the term of this patent is extended or adjusted under 35 U.S.C. 154(b) by 755 days.

This patent is subject to a terminal disclaimer.

(21) Appl. No.: 17/942,530

(22) Filed: Sep. 12, 2022

(65) Prior Publication Data

US 2023/0005324 A1 Jan. 5, 2023

Related U.S. Application Data

(63) Continuation of application No. 16/801,487, filed on Feb. 26, 2020, now Pat. No. 11,450,172.

(Continued)

(51) Int. Cl.
*G07F 17/32* (2006.01)
*G07F 17/38* (2006.01)

(52) U.S. Cl.
CPC ...... *G07F 17/3295* (2013.01); *G07F 17/3209* (2013.01); *G07F 17/3213* (2013.01);

(Continued)

(58) Field of Classification Search
CPC ............ G07F 17/3216; G07F 17/3213; G07F 17/3269; G07F 17/3276; G07F 17/3295;

(Continued)

(56) References Cited

U.S. PATENT DOCUMENTS

D237,286 S 10/1975 Miller
D237,727 S 11/1975 Runte (Continued)

FOREIGN PATENT DOCUMENTS

EP 0449433 A2 10/1991
GB 2251112 A 6/1992
GB 2382911 A 6/2003

OTHER PUBLICATIONS

Prosafiagaming, Evolution of Wendy O. Koopa Battles (1988-2017); published date Jan. 21, 2017; https://www.youtube.com/watch?v=jusXBiQRk_Q (Year: 2017).*

(Continued)

*Primary Examiner* — Jasson H Yoo
(74) *Attorney, Agent, or Firm* — BEKIARES ELIEZER LLP

(57) ABSTRACT

Systems and methods for a skill-based games are provided with the present disclosure. A plurality of targets each are displayed and moved about a playfield shown on a display of an amusement system according to one or more non-random, learnable sequences or patterns. Upon receipt of an input at one or more of player controls of a player station of the amusement system, a game play is initiated and an object is directed along the playfield from the player station. If the object engages a target of the plurality of targets, the game play is ended and it is determined whether a threshold criterion for obtainment of the target has been met. An award (Continued)

is distributed to the player station if the threshold criterion for obtainment of the target has been met. Other aspects also are described.

30 Claims, 22 Drawing Sheets

Related U.S. Application Data

(60) Provisional application No. 62/820,665, filed on Mar. 19, 2019.

(52) U.S. Cl.
CPC ...... *G07F 17/3216* (2013.01); *G07F 17/3244* (2013.01); *G07F 17/3246* (2013.01); *G07F 17/3262* (2013.01); *G07F 17/3269* (2013.01); *G07F 17/3276* (2013.01); *G07F 17/38* (2013.01)

(58) Field of Classification Search
CPC ............. G07F 17/3244; G07F 17/3262; G07F 17/3267; G07F 17/38; A63F 13/837
See application file for complete search history.

(56) References Cited

U.S. PATENT DOCUMENTS

| | | | | |
|---|---|---|---|---|
| D238,379 | S | 1/1976 | Miller | |
| D247,321 | S | 2/1978 | Cook | |
| D249,729 | S | 9/1978 | Olson | |
| D252,636 | S | 8/1979 | Cook | |
| D275,114 | S | 8/1984 | Wickstead | |
| D275,772 | S | 10/1984 | Akopian | |
| D281,085 | S | 10/1985 | Smyth | |
| 5,114,157 | A | 5/1992 | Kita | |
| D364,650 | S | 11/1995 | Hanscom | |
| 5,482,289 | A | 1/1996 | Weingardt | |
| 5,775,993 | A | 7/1998 | Fentz | |
| 5,813,914 | A | 9/1998 | McKay | |
| D424,122 | S | 5/2000 | Dickenson | |
| 6,089,977 | A | 7/2000 | Bennett | |
| 6,264,561 | B1 | 7/2001 | Saffari et al. | |
| D460,915 | S | 7/2002 | Lynch | |
| D466,161 | S | 11/2002 | Takahashi | |
| 6,602,133 | B2 | 8/2003 | Chan | |
| 6,604,740 | B1 | 8/2003 | Singer et al. | |
| 6,688,984 | B2 | 2/2004 | Cole | |
| 6,692,005 | B2 | 2/2004 | Vancura et al. | |
| 6,743,102 | B1 | 6/2004 | Fiechter et al. | |
| 6,752,717 | B2 | 6/2004 | Vancura | |
| 6,780,109 | B2 | 8/2004 | Kaminkow | |
| 7,040,985 | B2 | 5/2006 | Vancura | |
| 7,108,602 | B2 | 9/2006 | Daly | |
| 7,237,775 | B2 | 7/2007 | Thomas et al. | |
| D548,801 | S | 8/2007 | Groswirt | |
| D549,785 | S | 8/2007 | Luciano, Jr. | |
| 7,291,069 | B2 | 11/2007 | Michaelson et al. | |
| 7,399,225 | B2 | 7/2008 | Kaminkow | |
| D579,500 | S | 10/2008 | Luciano, Jr. | |
| D595,783 | S | 7/2009 | Anderson | |
| D595,784 | S | 7/2009 | Wells | |
| D595,785 | S | 7/2009 | Wells | |
| 7,736,223 | B2 | 6/2010 | Pace | |
| 7,756,962 | B2 | 7/2010 | Kitchen | |
| D628,654 | S | 12/2010 | Miesch | |
| D631,919 | S | 2/2011 | Ortiz | |
| D637,652 | S | 5/2011 | Tahara | |
| D641,047 | S | 7/2011 | Tahara | |
| 8,118,660 | B2 | 2/2012 | Pace | |
| D655,763 | S | 3/2012 | Salsaa | |
| D657,823 | S | 4/2012 | Gutowski | |
| D677,655 | S | 3/2013 | Sirotich | |
| D684,972 | S | 6/2013 | Benson | |
| 8,469,792 | B2 | 6/2013 | Pace | |
| 8,491,369 | B2 | 7/2013 | Kowell | |
| 8,502,789 | B2 | 8/2013 | Tse | |
| 8,702,495 | B2 | 4/2014 | Hornik et al. | |
| 8,795,055 | B2 | 8/2014 | Vancura | |
| 8,864,135 | B2 | 10/2014 | Baelocher | |
| 8,870,663 | B2 | 10/2014 | Cole | |
| 8,920,231 | B2 | 12/2014 | Pace | |
| 9,258,704 | B2 | 2/2016 | Zucker | |
| D761,918 | S | 7/2016 | Kelly | |
| 9,501,896 | B2 | 11/2016 | Pace | |
| RE46,738 | E | 2/2018 | Sasaki | |
| D810,829 | S | 2/2018 | Loynes | |
| D810,834 | S | 2/2018 | Kelly | |
| D825,668 | S | 8/2018 | Hedrick | |
| 10,068,434 | B2 | 9/2018 | Colvin et al. | |
| 10,140,813 | B2 | 11/2018 | Arnone et al. | |
| 10,140,815 | B2 | 11/2018 | Arnone et al. | |
| 10,147,268 | B2 | 12/2018 | Walker et al. | |
| 10,147,274 | B2 | 12/2018 | Arnone et al. | |
| 10,152,848 | B2 | 12/2018 | Acres | |
| 10,204,482 | B2 | 2/2019 | Pace | |
| D843,471 | S | 3/2019 | Castro | |
| D843,472 | S | 3/2019 | Castro | |
| 10,410,467 | B2 | 9/2019 | Acres | |
| 10,453,294 | B2 | 10/2019 | Hase et al. | |
| 10,453,310 | B2 | 10/2019 | Hirai et al. | |
| 10,460,565 | B2 | 10/2019 | Vann | |
| 10,497,218 | B2 | 12/2019 | Colvin et al. | |
| D878,473 | S | 3/2020 | Thoeni | |
| 11,062,557 | B2 | 7/2021 | Pace | |
| 11,138,824 | B1 | 10/2021 | Vrabec | |
| 11,450,172 | B2 | 9/2022 | Wesson | |
| 2003/0060276 | A1 | 3/2003 | Walker et al. | |
| 2003/0153382 | A1 | 8/2003 | Vancura | |
| 2004/0024666 | A1 | 2/2004 | Walker et al. | |
| 2004/0048660 | A1 | 3/2004 | Gentles et al. | |
| 2004/0053676 | A1 | 3/2004 | Rodgers | |
| 2004/0053695 | A1 * | 3/2004 | Mattice | G07F 17/32 463/42 |
| 2004/0127277 | A1 | 7/2004 | Walker et al. | |
| 2004/0133485 | A1 | 7/2004 | Schoonmaker | |
| 2004/0162135 | A1 | 8/2004 | Flanagan-Parks | |
| 2004/0166940 | A1 | 8/2004 | Rothschild | |
| 2004/0176167 | A1 | 9/2004 | Michaelson et al. | |
| 2004/0219969 | A1 | 11/2004 | Casey | |
| 2004/0224745 | A1 | 11/2004 | Bregenzer | |
| 2004/0224753 | A1 | 11/2004 | O'Donovan et al. | |
| 2005/0003883 | A1 | 1/2005 | Muir et al. | |
| 2005/0009599 | A1 | 1/2005 | Ryan | |
| 2005/0020344 | A1 | 1/2005 | Kaminkow | |
| 2005/0097359 | A1 | 5/2005 | Speare et al. | |
| 2005/0121850 | A1 | 6/2005 | Pierce | |
| 2005/0148384 | A1 | 7/2005 | Marks et al. | |
| 2005/0181851 | A1 | 8/2005 | Amaitis et al. | |
| 2005/0215311 | A1 | 9/2005 | Hornik et al. | |
| 2005/0261056 | A1 | 11/2005 | Smolucha | |
| 2006/0040730 | A1 | 2/2006 | Walker et al. | |
| 2006/0046831 | A1 | 3/2006 | Takano et al. | |
| 2006/0059571 | A1 | 3/2006 | Chen et al. | |
| 2006/0079321 | A1 | 4/2006 | Walker | |
| 2006/0084495 | A1 | 4/2006 | Jaffe | |
| 2006/0089195 | A1 | 4/2006 | Walker et al. | |
| 2006/0135243 | A1 * | 6/2006 | Englman | A63F 13/45 463/16 |
| 2006/0160613 | A1 | 7/2006 | Hornik et al. | |
| 2006/0172796 | A1 | 8/2006 | Vancura | |
| 2006/0232004 | A1 | 10/2006 | Walker et al. | |
| 2006/0247031 | A1 | 11/2006 | Walker et al. | |
| 2007/0060252 | A1 | 3/2007 | Taylor | |
| 2007/0060279 | A1 | 3/2007 | Okada et al. | |
| 2007/0072682 | A1 | 3/2007 | Crawford | |
| 2008/0227525 | A1 | 9/2008 | Kelly | |
| 2009/0221375 | A1 | 9/2009 | Luciano, Jr. | |
| 2009/0298591 | A1 | 12/2009 | Mao et al. | |
| 2010/0016048 | A1 | 1/2010 | Chu et al. | |
| 2011/0034226 | A1 | 2/2011 | Kuo et al. | |
| 2011/0173587 | A1 * | 7/2011 | Detwiller | A63F 13/92 717/109 |

(56) References Cited

U.S. PATENT DOCUMENTS

| | | | | |
|---|---|---|---|---|
| 2011/0212766 | A1* | 9/2011 | Bowers | G07F 17/32 463/25 |
| 2011/0294564 | A1* | 12/2011 | Michelstein | A63F 13/46 463/23 |
| 2014/0378196 | A1 | 12/2014 | Caldwell et al. | |
| 2015/0057065 | A1 | 2/2015 | Blackwelder et al. | |
| 2016/0049039 | A1 | 2/2016 | Blackwelder et al. | |
| 2016/0252729 | A1 | 9/2016 | Doucet | |
| 2016/0343211 | A1* | 11/2016 | Graboyes Goldman | G07F 17/3225 |
| 2017/0149824 | A1 | 5/2017 | Bendersky et al. | |
| 2017/0154494 | A1 | 6/2017 | Cire | |
| 2018/0081903 | A1 | 3/2018 | McKenzie et al. | |
| 2019/0206186 | A1 | 7/2019 | Pace | |
| 2020/0005587 | A1 | 1/2020 | Hartl | |

OTHER PUBLICATIONS

Turner, Clay S.; Tic-Tac-Fruit: An Analysis; Nov. 15, 2004.

Farley, Nick; Report on the Review and Analysis of the Tic-Tac-Fruit Game, Letter to Kurt O. Gearhiser, Esq.; Mar. 7, 2005.

Kowell, Grant F.; Provisional Application for Patent; Method and Apparatus for Playing a Skill Game; U.S. Appl. No. 60/815,352; Jun. 21, 2006.

Fey, Marshall; Slot Machines; An Illustrated History of America's Most Popular Coin-Operated Gaming Device; First Edition; 1983.

Fey, Marshall; Slot Machines; A Pictorial History of the First 100 Years—The Colorful Story of the World's Most Popular Gaming Device; 1983 (First Printing), 1989 (Second Printing).

Cummings, Christopher; Linkedin; Dragon Master; https://www.linkedin.com/pulse/cross-five-skill-dragon-master-chrisotoper-cummings?trk=public_profile_article_view; dated Feb. 21, 2018.

* cited by examiner

AMUSEMENT SYSTEM FOR SKILL-BASED GAMES AND METHODS DIRECTED TO THE SAME

CROSS-REFERENCE TO RELATED APPLICATIONS

This application is a continuation of previously filed, co-pending U.S. patent application Ser. No. 16/801,487, filed Feb. 26, 2020, which claims the benefit of U.S. Provisional Patent Application No. 62/820,665, filed Mar. 19, 2019.

INCORPORATION BY REFERENCE

The disclosure and drawings of U.S. patent application Ser. No. 16/801,487, filed Feb. 26, 2020, and U.S. Provisional Patent Application No. 62/820,665, filed Mar. 19, 2019, are incorporated by reference herein as if set forth in their entireties.

BACKGROUND

Outside of a few jurisdictions, such as Nevada, New Jersey, and certain Tribal Lands, random-based gambling games, i.e., "games of chance" including slot-style games, are generally prohibited/illegal. In a growing number of jurisdictions, however, skill-based electronic games are allowed, though with available games, players generally are limited in the amounts they are allowed to win. That is, these games are set up with a prescribed payout limit of between about 92% and about 98%, and regardless of a player's skill, players generally cannot win more than 100% of their monies spent to play over time and likewise cannot achieve a Return to Player ("RTP") of greater than the prescribed payout limit of about 92% to about 98%. Also, many of these existing games may follow a preset list of outcomes, many of which do not allow a player to win the same regardless of their skill or strategy in playing. As a result, due to such limitations, some jurisdictions have viewed these so-called "skill" games as games of chance and have prohibited their use in such jurisdictions.

Furthermore, while some electronic game systems may provide multiple player stations that allow for multiple players to participate in game play, such systems generally are not modular or reconfigurable to allow for changes in the number and/or configuration of the player stations. Thus, for example, gaming operators or service providers that may only have an immediate need for a system(s) with a limited number of player stations (e.g., 2 or 4 player stations), but which may wish to expand the system (e.g., to 6, 8, 10, or 12 or more player stations) later to meet future demands, must decide whether to purchase a smaller system immediately and purchase a larger system later to meet future demands, or to immediately purchase a larger system, which may or may not ever be fully used. Both of these scenarios may cost the gaming operator/service provider unnecessary amounts of money.

Accordingly, it can be seen that a need exists for an amusement system that addresses the foregoing and other related and unrelated issues/problems in the art.

SUMMARY

Briefly described, in one aspect, the present disclosure is directed to an amusement or gaming system or machine that facilitates play of skill-based, electronic game(s) that allow players to spend money and win awards including money, prizes, credits, or other rewards by exercise of skill, including winning awards greater than a player's spend through the exercise of such skill. Effectively, a player's ability to win a prize or award is dependent on their exercise of skill, for example, learning and executing rules, patterns, and other features of the game as opposed to random chance or "blind luck." The amusement system can include a gaming cabinet or housing that supports a display (e.g., a flat panel display or monitor). The display can provide a series of screens, images, etc. supporting play of the game(s). The gaming cabinet further can include a plurality of modular player stations positioned about the display (e.g., positioned about a periphery thereof).

Each player station generally includes a plurality of game or player controls (e.g., buttons, joysticks, directional pads, levers, etc.) that allow individual users players to play the game(s) and control and/or select various corresponding gaming elements or features shown on the display. Each player station further can include one or more monetary interface peripherals (e.g., a bill acceptor, printer, etc.). The player stations also can include audio and lighting features/elements (e.g., speakers or other audio producing transducers and LED lighting elements, lightbulbs, etc.) that provide effects in concert with or otherwise corresponding to game play.

In one embodiment, the gaming cabinet generally is configured to enable expansion or reduction of the number of player stations. For example, the player stations can be quickly connected to and disconnected from the gaming cabinet to increase or decrease the number of players that can participate in the games. The gaming cabinet further can be configured to allow for reconfiguration of the player stations (e.g., changing the alignment, orientation, positioning, etc. thereof in relation to the display and/or cabinet).

In one construction, the amusement system can be reconfigurable between a plurality of player station configurations, orientations, etc., including but not limited to single, dual inline or upright (2-player); dual opposing (e.g., a cocktail table arrangement) (2-player); 4-player; 6-player; 8-player; 10-player; and up to 12-player or more player station configurations. The amusement system further can have a control system or control circuit that provides a distributed, discrete I/O scheme, e.g., that is scalable as desired, such that only the capacity required can be included and/or utilized.

In one embodiment, the amusement system can include a centralized or host control system having one or more processors, e.g., microprocessors, CPUs, etc., that is in communication with the individually connectable or linkable player stations, which each can have their own player station control systems, with one or more processors in communication with the centralized control system. The player station control systems communicate or cooperate with the centralized control system to send and receive instructions, feedback, workflows, signals, etc. to facilitate game play and other functions of the amusement system. Each of the player station control systems generally controls and provides processing of one or more actions of its corresponding game controls and monetary interface peripherals, as well as the audio and lighting features of the player station. The player station controls also can provide tactile or haptic feedback during game play.

The centralized control system and the player station control systems access, run, and coordinate action of one or more actions or components of a gaming platform that provide for play of one or more skill-based games with the amusement system. The amusement system further will include or provide skill-based games with prescribed operations or patterns incorporating a series of learnable skill applications/features, operable without the use of Random Number Generators (RNGs) or other randomized, compensation algorithms, automatic awards algorithms, etc., that introduce "chance" into the game or otherwise limit the player's exercise of skill or ability to win a game. For example, the games can include an environment of changing screens, colors, characters, elements or features, etc., which can provide the appearance/randomness of randomness, but also include rules and identifiable patterns that a player can learn or strategize against to develop their skill and ability at playing the game to consistently attain awards greater than the amount the player has spent (or a greater than 100% Return to Player ("RTP").

In one embodiment, the gaming platform can provide a video playfield on the display of the gaming cabinet, which playfield is used by one or more players (e.g., accessing the controls of a corresponding player station) to compete for awards or prizes that are made available over time. The awards or prizes can include or otherwise be associated with targets that move across the playfield according to learnable patterns, including a plurality of repetitive motions that can be learned, recognized and anticipated by player skill and experience. The targets further can have differing appearances, values, and difficulty levels of attainment. Generally, selected size, flashier, and/or more agile targets, which can be more difficult to obtain, can have a higher potential award or prize values. In one variation, derivations in size of different target types can be used as lower-value and higher-value targets. As a result, the skill of the players (e.g., their decision making, ability to take certain actions quickly, ability to recognize and/or learn patterns, learn and/or memorize game instructions or rules, etc.) and their knowledge of the conditions of the game will determine immediate and long-term outcomes (e.g., awards, prizes, winnings, bonus pools, etc.). Therefore, it is possible for skilled players to attain outcomes/award values that result in a consistently greater than 100% RTP over time, and with outcomes based on chance and/or which are predetermined being substantially eliminated.

In one embodiment, a skill-based, amusement system includes a plurality of player stations each having a one or more player controls operable to generate inputs for play of a skill-based game presented on a display, and a host control system in communication with the plurality of player stations. The host control system including a memory and one or more processors accessing instructions stored in the memory to provide play of the skill-based game on the display, such that the amusement system is configured to provide a playfield on the display; present and direct a series of independently identifiable targets about the playfield, with each target moving along a non-random, predictable path based on instructions stored in the memory, and with different ones of the series of targets associated with different meta or sub-games defined by a series of game instructions or rules stored in the memory and accessible by players at the player stations; receive a cost for a play of the skill-based game from one or more active player stations; receive one or more game play input signals from one or more player controls of an active player station, and in response, directing one or more objects along the playfield; and if one or more targets are engaged by the one or more objects, initiate a sub or meta-game associated with the one or more targets and determine whether one or more of the active player station has obtained an award based on game rules or instructions related to the sub or meta-game associated with the one or more targets. Players at the player stations can use strategy or skill to direct objects at select ones of the plurality of targets to achieve a return to the player greater than 100%.

Some targets of the series of targets can have a higher difficulty of obtainment than other targets of the series of targets. Targets with the higher difficulty of obtainment are more flashy and/or more agile and provide higher award values than the other targets with a lower difficulty of obtainment.

The amusement system further can be configured to determine whether a threshold criterion for obtaining or capturing one or more engaged targets has been met to determine whether the active player station should receive the award, and if the threshold criterion has been met, initiate a predetermined audio or visual sequence associated with obtainment or capture of the one or more engaged targets and distribute the award to active player station. The threshold criterion requires a power value associated with the one or more engaged targets to be at or below a predetermined threshold value. In addition, or in the alternative, the threshold criterion requires a power value associated with the one or more objects to equal or be greater than a predefined threshold value for obtaining the one or more engaged targets.

The power value associated with the one or more objects can be modified based upon a volatility enhancement script that increases and/or decreases the power value associated with the one or more objects over time according to recognizable or memorizable patterns or sequences that generally repeat over time.

The threshold criterion can require a power value associated with the one or more engaged targets to be at or below a predetermined threshold value and a power value associated with the one or more objects to equal or be greater than a predefined threshold value for obtaining the one or more engaged targets.

The series of differently identifiable targets are each part of a predefined target class of a plurality of predefined target classes, and wherein the power value associated with the one or more objects is determined based on power values awarded for previously engaged targets that are part of a predefined target class including the one or more engaged targets.

The plurality of player controls of each player station can include a series of buttons assignable to one of a series of game play actions, and a magnetic joy stick that facilitates directing of the one or more objects about the playfield.

Each player station further can have one or more monetary interface peripherals including a bill accepter and a printer.

Each of the series of targets can be spawned onto the playfield according to prescribed target spawning sequences based on rules controlling a quantity of targets and a mix of particular target types.

When a target of the series of targets is engaged by the one or more objects, the target can be moved along a secondary, non-random predictable path that is significantly recognizable or independent from the non-random, predictable path. Additionally, if the target is engaged by one or more additional targets, the target can be moved along an additional, non-random, predictable path or returned to the non-random, predictable path.

In one embodiment, a method for a skill-based amusement system includes providing a playfield on a display associated with the skill-based, amusement system; presenting and directing a series of differently identifiable targets about the playfield, with each target moving along a non-random, predictable path based on information or instructions stored in the memory, and with different ones of the plurality of targets associated with different meta or sub-games defined by a series of game instructions or rules stored in the memory and accessible by players at the player stations; receiving one or more game play input signals from one or more player controls of an active player station, and in response, directing one or more objects along the playfield; and if one or more targets are engaged by the one or more objects, initiating a sub or meta-game associated with the one or more targets and determining whether one or more of the active player stations should receive an award based on game rules or instructions related to the sub or meta-game associated with the one or more targets. Players at the player stations can use strategy or skill to direct objects at select ones of the plurality of targets to achieve a return to player of greater than 100%.

The method further can include determining whether a threshold criterion for obtaining or capturing one or more engaged targets has been met to determine whether the active player station should receive the award, and if the threshold criterion has been met, initiating a predetermined audio or visual sequence associated with obtainment or capture of the one or more engaged targets and distributing the award to active player station.

The threshold criterion can require a power value associated with the one or more engaged targets to be at or below a predetermined threshold value. In addition, or in the alternative, the threshold criterion can require a power value associated with the one or more objects to equal or be greater than a predefined threshold value for obtaining the one or more engaged targets.

The method further can include modifying the power value associated with the one or more objects based on a volatility enhancement script that increases and/or decreases the power value associated with the one or more objects over time according to recognizable or memorizable patterns that generally repeat over time.

In one embodiment, an amusement system includes a display for play of a skill-based game thereon; and one or more processors in communication with at least one memory having stored therein program instructions for play of the skill-based game. When the program instructions are executed by the one or more processors, the amusement system is caused to: provide a playfield on the display; present and direct a plurality of identifiable or recognizable targets about the playfield, with each target moving along a non-random path based on information or instructions stored in the memory, and with different ones of the plurality of targets being associated with different meta or sub-games, each defined by a series of game instructions or rules stored in the memory and accessible by players at the player stations; receive one or more game play input signals from one or more player controls of an active player station, and in response, directing one or more objects along the playfield; and if one or more targets are engaged by the one or more objects, initiate a meta or sub-game associated with the one or more targets and determine whether one or more of the active player station should receive an award based on game rules or instructions related to the sub or meta-game associated with the one or more targets. The players at the player stations can use strategy or skill to direct objects at select ones of the plurality of targets to achieve a return to player of greater than 100%.

The amusement system further can include at least one personal electronic device, and the display and at least one of the one or more processors can be part of the at least one personal electronic device. The at least one personal electronic device can include a smart phone, tablet, or personal computer.

The amusement system further can include a cabinet supporting the display, and a plurality of player stations positioned about the cabinet, each of the player stations operatively linked with the one or more processors and having a plurality of player controls configured to enable play of the skill-based game by players at the player stations. The plurality of player controls of each player station can include a series of physical buttons assignable to one of a series of game play actions, and a magnetic joy stick to facilitate directing of the one or more objects about the playfield. Each player station further can include one or more monetary interface peripherals.

In one embodiment, a skill-based, amusement system can include a cabinet including a display providing a playfield for displaying a skill-based game, and a plurality of player stations linked to the display. Each of the player stations can have a plurality of player controls configured to enable play of the skill-based game by players at the player stations. The skill-based, amusement system further includes one or more game control systems including at least one processor that accesses and executes gaming logic instructions stored on one or more corresponding memories to cause the amusement system to: move a plurality of targets about the playfield according to one or more non-random sequences or patterns, the targets comprising sets of different size, configuration, type, class, and/or color targets; receive player selected play options for one or more game plays of the skill-based game from at least one active player station of the plurality of player stations; receive and set a cost for a game play of the skilled-based game from the at least one active player station; upon receipt of an input responsive to operation of one or more of the plurality of player controls of the at least one active player station, initiating a game play of the skilled-based game and directing an object along the playfield from the player station toward a target of the plurality of targets; and if the object engages a target, determine whether a threshold criterion for obtaining the target has been met during the game play.

The amusement system can distribute an award to the player station if the threshold criterion for obtaining the target is met. The threshold criterion can require a power value associated with the one or more engaged targets to be at or below a predetermined threshold value. In addition, or in the alternative, the threshold criterion requires a power value associated with the one or more objects to equal or be greater than a predefined threshold value for obtaining the one or more engaged targets.

The plurality of player controls of each player station further can include a series of buttons assignable to one of a series of game play actions, and a joy stick that facilitates player direction of the object along the playfield. Each player station further can include a bill accepter and a printer.

The skill-based, amusement system further can include sound and lighting features that are activated in response to occurrence of events during play of the skill-based game.

One or more targets of the plurality of targets can be configured as communal targets for engagement by multiple players for a communal mode game play. The amusement system further can be configured to: determine the power level of each communal target based on a specific target identifier and an event log that records engagements by each player station from which each object engaging the communal target was directed and target engagements by other player stations participating in the communal mode game play; and if the power level of the target is at or below a threshold level, generate an indicator to indicate that the target has been obtained, and determine an award for the player station that obtained the target.

One or more targets of the plurality of targets can be configured as individual mode targets. The amusement system further can be configured to: determine the power level of the target based on a target identifier and an event log that records engagements by the player station from which an object engaging the target was directed; and if the power level of the target is at or below a threshold level, generate an indicator to indicate that the target has been obtained, and determine an award to be provided to the player station from which the object was directed.

The skill-based, amusement system further can be configured to: change a feature associated with objects during selected game plays; determine a feature match by comparing the features of the objects fired to a feature of the target; and if a feature match percentage is at or above a predetermined threshold, providing an award or a bonus to the player station from which the object was directed.

The skill-based, amusement system amusement system can determine an award for obtainment of the target based on an amount of time remaining on a timer associated with the target.

The skill-based game can be subdivided into multiple levels each including unique features, a theme, one or more level-specific targets, special power-ups, and combinations thereof.

In one embodiment, a method for play of a skill-based game can include presenting a plurality of differently identifiable targets on a playfield shown on a display of an amusement system; moving or directing each of the plurality of targets about the playfield in accordance with a non-random, identifiable sequence or pattern; setting one or more player selected play options for game plays of the skill-based game at the player station; upon receipt of an input from one or more of the plurality of player controls at the player station, initiating a play of the skilled-based game, including directing one or more objects at one or more of the plurality of targets moving across the playfield from the player station; and if an object engages a target of the plurality of targets, ending the game play and determining whether a threshold criterion for obtaining a target award for the target has been met, wherein players are enabled to increase the award through application of skill to recognize and engage targets with increased award values or bonus values associated therewith.

The method further can include determining whether a power level of the target is at or below a threshold value for obtaining the target. The object can include a prescribed object value that is deducted from the power level of the target when the object engages the target to determine whether the power level of the target is at or below the threshold value for obtaining the target.

The method further can include determining the power level of the target based on a specific target identifier and an event log that records engagements by the player station from which the object was directed and hits by other player stations participating in the skill-based game; and if the power level of the target is at or below a threshold level, generating an indicator to indicate that the target has been obtained, and determining awards to be provided to the player station from which the object was directed and additional player stations that directed one or more objects that engaged the target.

The method further can include determining the power level of the target based on a specific target identifier and an event log that records engagements by the player station from which the object was directed; and if the power level of the target is at or below a threshold level, generating an indicator to indicate that the target has been obtained, and determining an award to be provided to the player station from which the object was directed.

The method of further can include continuously changing a color of an indicator associated with the object; determining a feature match percentage by comparing a current color of the object, when the object engages the target, to a color of the target; and if the feature match percentage is at or above a predetermined threshold, providing a bonus to the player station from which the object was directed.

Various objects, features and advantages of the present disclosure will become apparent to those skilled in the art upon a review of the following detail description, when taken in conjunction with the accompanying drawings.

BRIEF DESCRIPTION OF THE DRAWINGS

It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As generally shown in FIGS. 1-12, the present disclosure describes an amusement or gaming system or machine 10 that facilitates play of one or more skill-based games, e.g., in which players are able to use skill or specific strategies to obtain a higher rate of return (as referred to as return to player ("RTP")), though it will be understood that other suitable electronic monetary games can be played on the amusement system 10, without departing from the scope of the present disclosure.

Figure 1A:
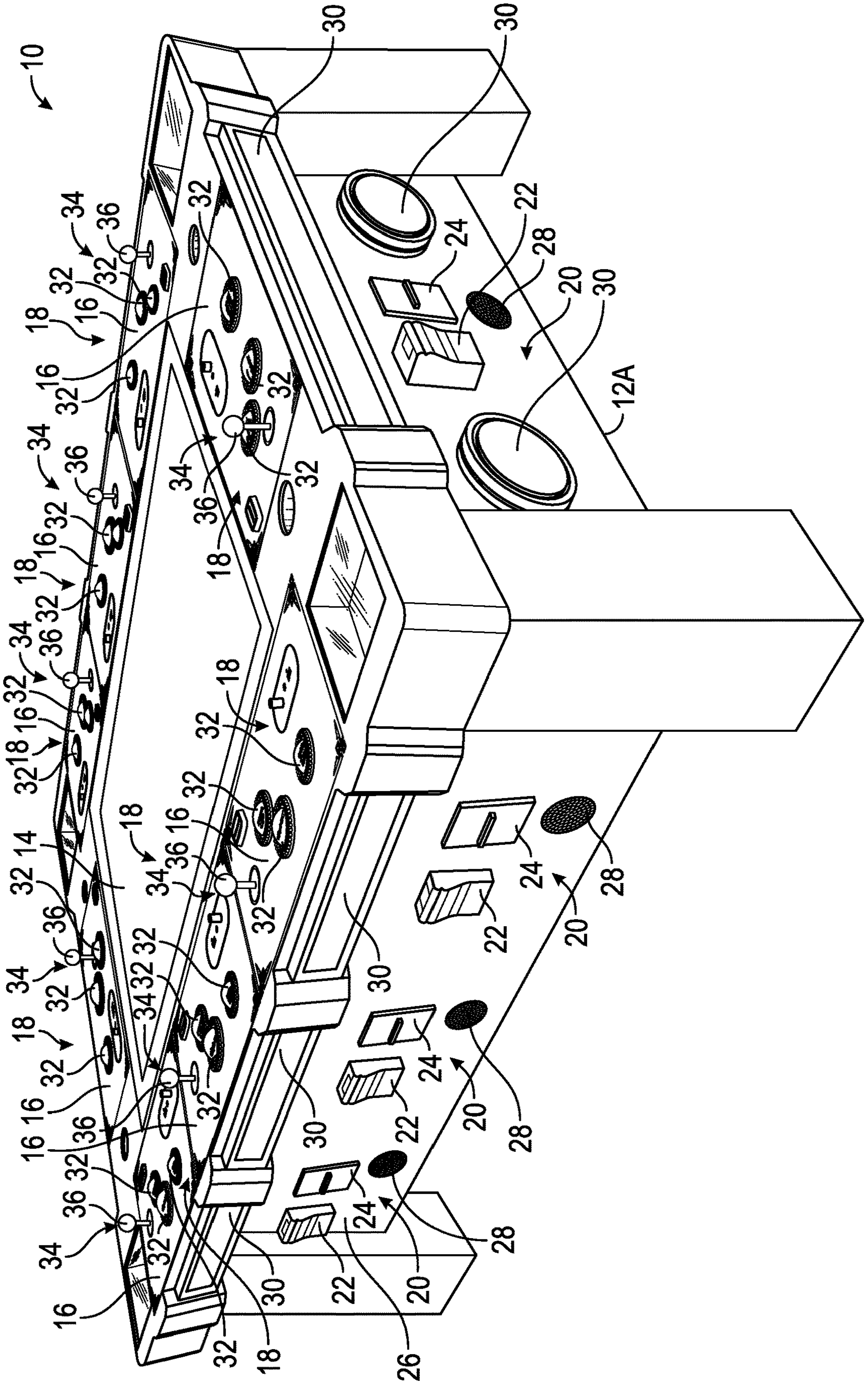
FIGS. 1A, 1B, 1C, 1D, and 1E show an amusement system with various gaming cabinet constructions according to principles of the present disclosure.

FIG. 1A shows an amusement system or machine 10 according to an embodiment of the present disclosure. As shown in FIG. 1A, the amusement system 10 can include a gaming cabinet or housing 12A that at least partially supports a display 14. The display 14 can include a panel display or monitor, such as a light emitting diode ("LED"), liquid crystal display ("LCD"), a cathode ray tube ("CRT"), plasma, etc. video display or monitor (e.g., in one embodiment, a 55" or more high-brightness 4k UHD LCD monitor) or other suitable video display or monitor. The gaming cabinet 12A further includes a plurality of interchangeable and/or modular player stations 16 positioned around or otherwise about the display 14.

In the embodiment illustrated in FIG. 1A, the player stations 16 are positioned about the periphery of the display 14, e.g., with one player station 16 at each end and three player stations 16 along the sides of the gaming cabinet 12. However, the gaming cabinet 12A generally is configured such that the player stations 16 can be added or removed from the gaming cabinet 12 to allow for easy plug-and-play, change-out, and/or replacement of stations and control of sets or arrangements, as well as for expansion/reduction of the number of available player stations 16, and further can be reconfigurable to change or alter positioning, orientation, etc. of the player stations 16. For example, the cabinet 12A can be reconfigurable to accommodate a plurality of player station configurations, including but not limited to single, dual inline (upright), dual opposing (cocktail table), 4-player, 6-player; 8-player, and up to 12-player player station configurations, though other numbers or arrangements of player station configurations can be used without departing from the scope of the present disclosure.

Figure 1B:
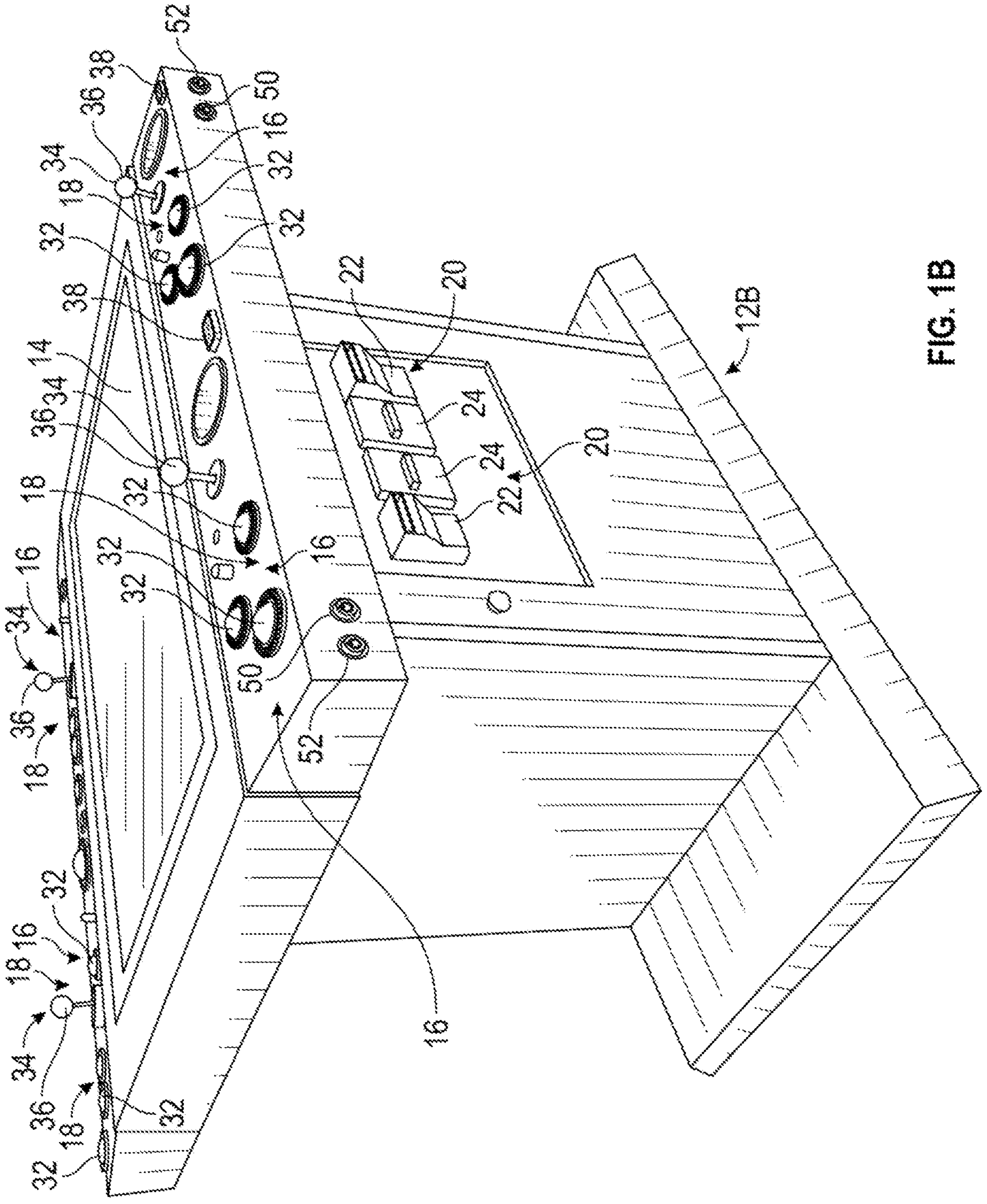
Figure 1C:
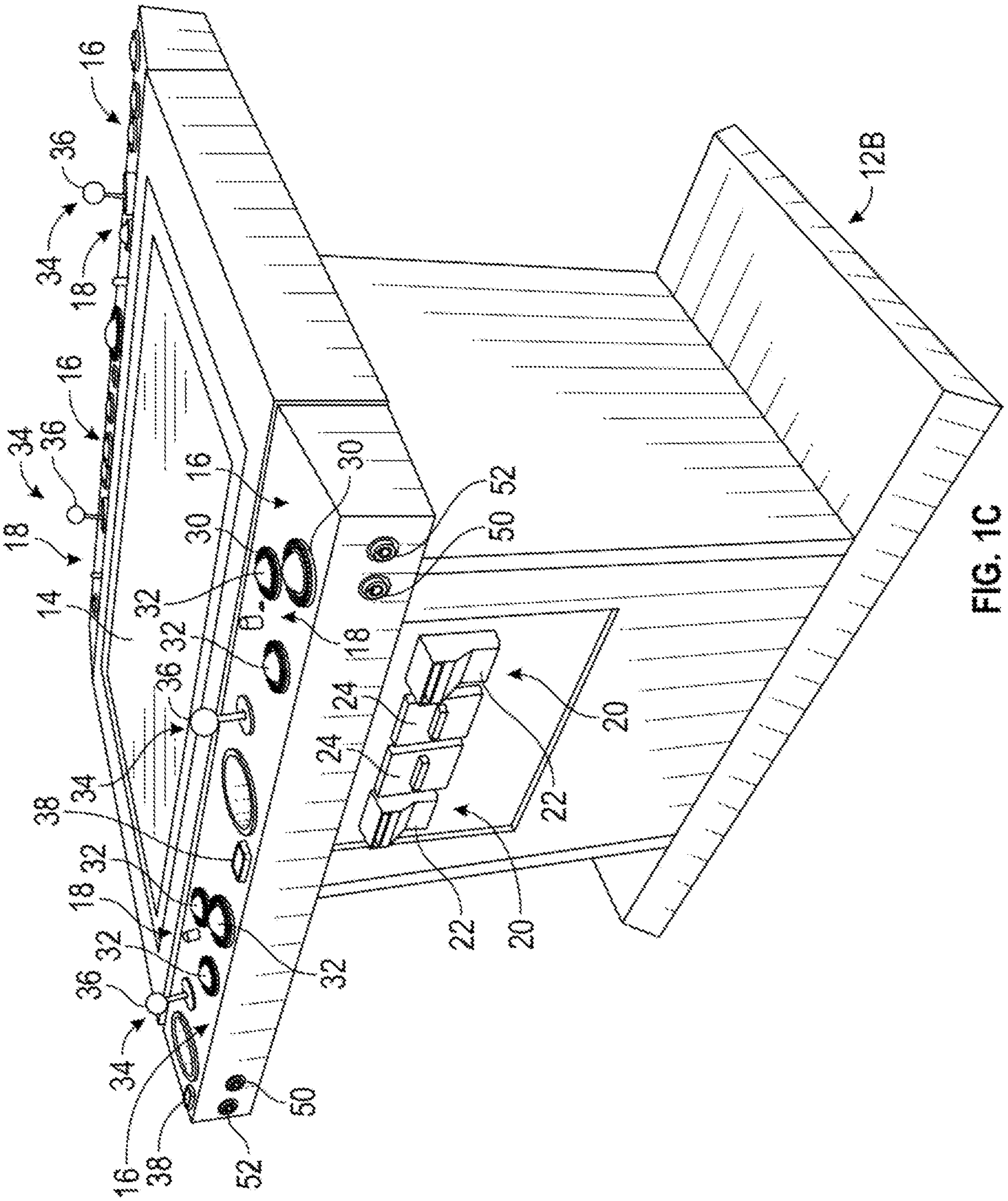

FIGS. 1B and 1C show a cabinet 12B according to an additional or alternative construction. As shown in FIGS. 1B-1C, the cabinet 12C includes at least two player stations 16 positioned on opposing sides of the display 14. FIGS. 1B-C further indicate that player stations 16 on one side of the cabinet 12C can be configured for right-handed players, and player stations on an opposing side of the cabinet 12C can be configured for left-handed players. However, all player stations 16 can be configured for only right handed players (or only left handed players), i.e., all of the player stations 16 can be identical, without departing from the scope of the present disclosure.

Figure 1D:
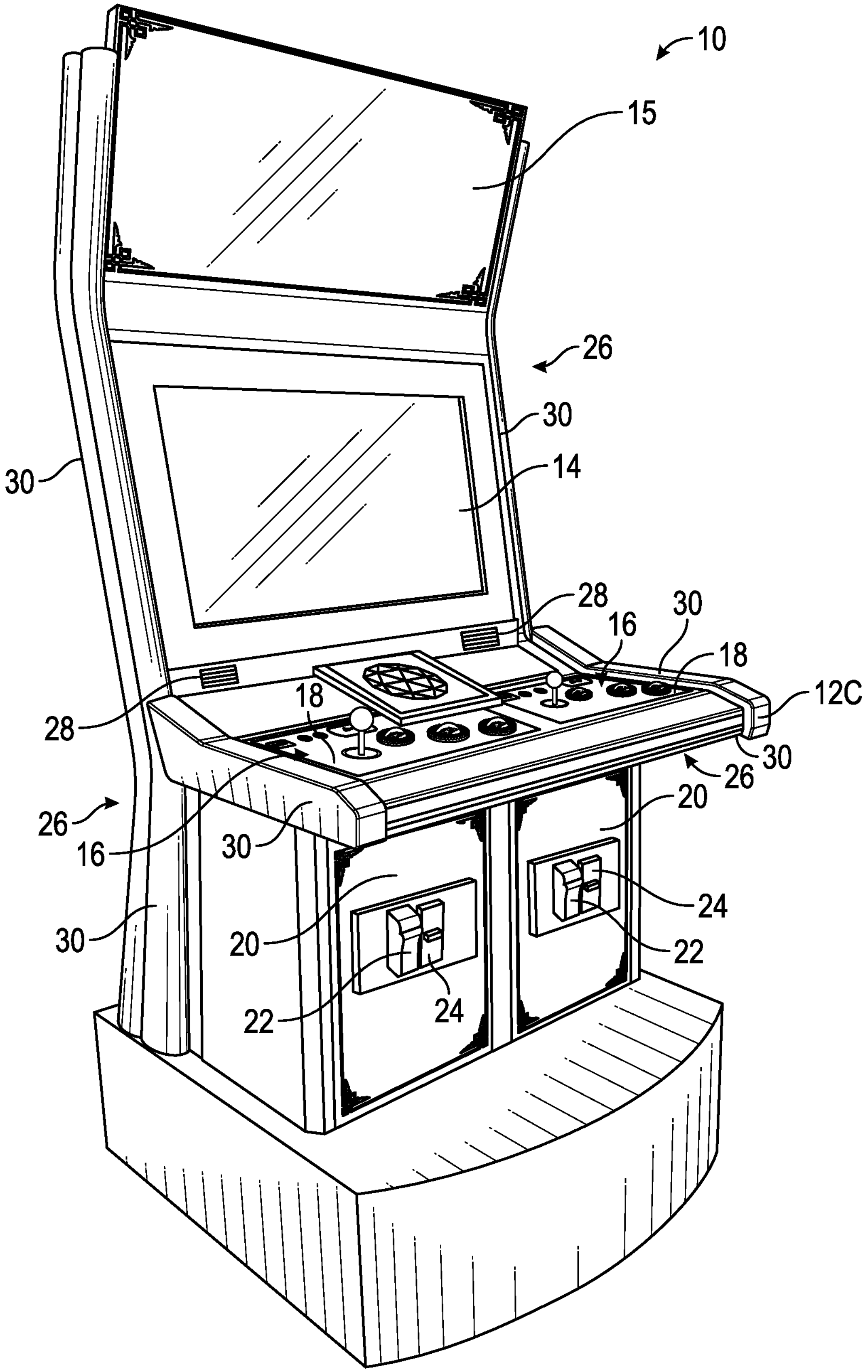
Figure 1E:
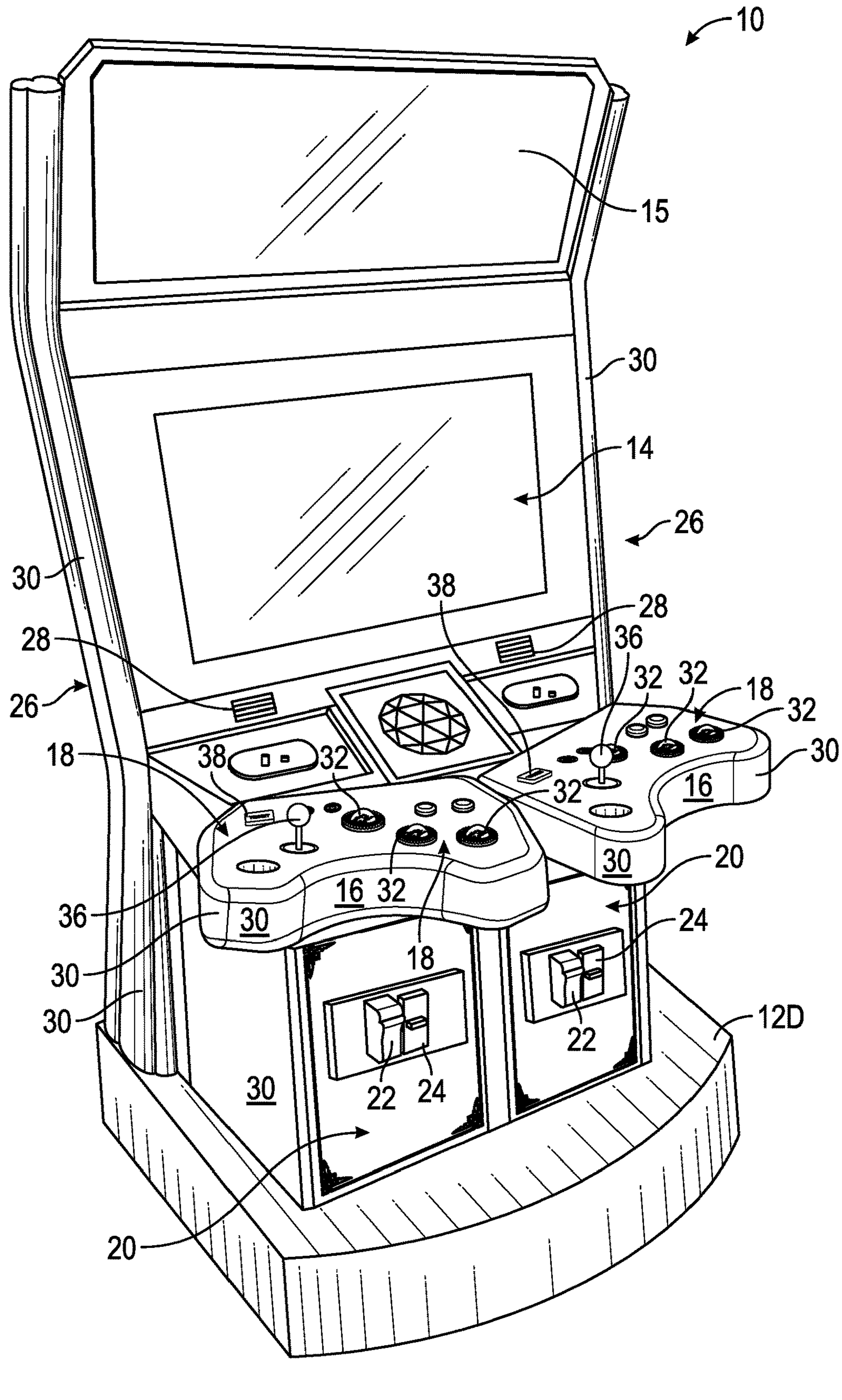
Figure 2:
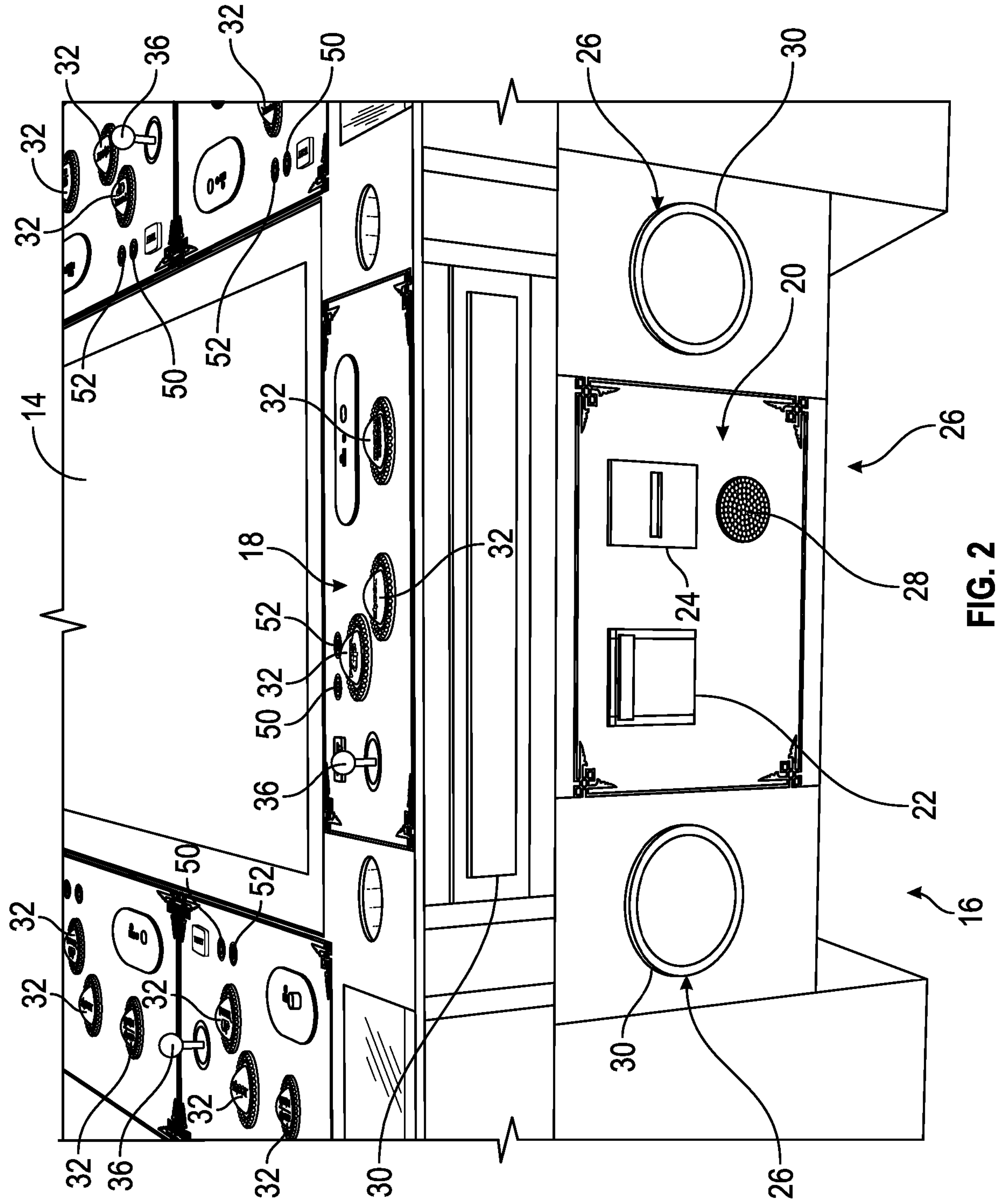
FIG. 2 shows a player station for an amusement system according to one example of the present disclosure.

FIGS. 1D and 1E show gaming cabinets 12C and 12D according to further additional or alternative constructions. As shown in FIGS. 1D and 1E, the amusement system 10 can include an arcade-style gaming cabinet or housing 12C/12D that at least partially supports the display 14 (e.g., including a liquid crystal display (LCD), a light emitting diode display (LED), a cathode ray tube (CRT) display, a plasma display, etc.) in a generally upright or vertical orientation. With gaming cabinets 12C/12D, the player stations 16 are positioned adjacent to the display 14, e.g., in front of the display 14 to allow players to view the display 14 at the player station(s) 16. In the constructions shown in FIGS. 1D and 1E, the gaming cabinets 12C/12D include a dual gaming cabinet with two player stations 16 arranged side by side; however, the gaming cabinets 12B/12C can include any suitable number of player stations 16, such as three, four, five, or more, without departing from the scope of the present disclosure.

As further shown in FIG. 1C, the player stations 16 can be arranged to be generally parallel along the gaming cabinet 12C, and as shown in FIG. 1E, the player stations 16 can be arranged at a slight offset or angle in relation to each other along the gaming cabinet 12D, e.g., to help to provide improved spacing or comfort of the players during game play. The gaming cabinets 12C/12D further can include an optional, secondary video display 15 (e.g., including a light up display or a video display, such as a liquid crystal display ("LCD"), a cathode ray tube ("CRT") display, a light emitting diode ("LED") display, a plasma display, etc.) provided therealong, e.g., along an upper or top portion or area of the gaming cabinets 12C/12D. The secondary display 15 may show any combination of game information, ancillary information, or other related information to the players, such as player information, bonus information, advertisements, selectable game options, etc.

As shown in FIGS. 1A-1E and 2, the player stations 16 can have a set of game or player controls or a player interface 18 (e.g., including joysticks, directional pads, physical buttons, and/or other selectable mechanisms, levers, etc.), monetary interface peripherals 20 (e.g., including a credit input interface, such as a bill acceptor 22, and a printer 24), as well as effects peripherals 26 (such as sound 28 and lighting 30 features/elements). The bill acceptor 22 can accept valid notes of currency, e.g., bills or coins, that are converted to credits at the individual player stations 16. The printer 24 can provide printouts, receipts, vouchers, etc. that record or provide payment or payout information, prize redemption tickets, as well as other suitable information, such as audit conformation and reports. The sound features/elements 28 can include audio speakers or other audio producing transducers configured to generate game play sound effects, music, etc. Audio Amplification can be stereo, with isolated headphone outputs. The lighting features 30 can include LEDs, lightbulbs, etc. or other suitable lighting features or elements, and can be illuminated to correspond to one or more events that occur during game play. FIGS. 1A and 1D-1E show that the lighting features 30 can be provided at various positions along the cabinet 12A, 12C, and 12D and the player stations 16.

Figure 3:
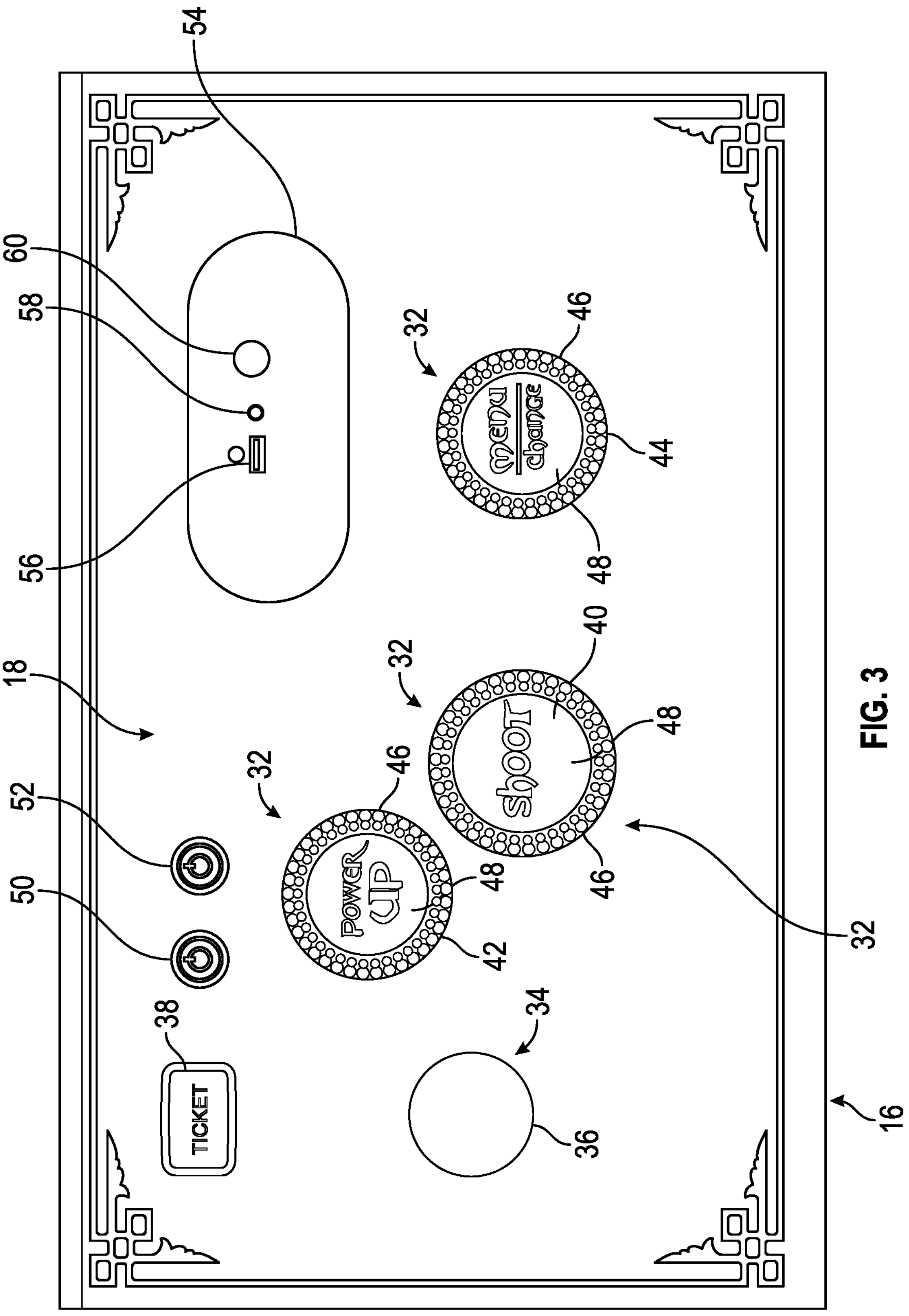
FIG. 3 shows player station controls for a player station according to one example of the present disclosure.

FIG. 3 shows player station controls 18 for a player station 16 according to one example embodiment. The controls 18 for each player station 16 include a plurality of buttons 32 that are actuatable or otherwise selectable and a directional controller 34 that can be actuated by a player to cause the amusement system 10 to perform one or more actions or operations. The buttons 32 and directional controller 34 can enable users to select, interact with, and/or operate and/or control elements, features, characters, or other aspects shown on the display 14 (or display 15) during game play.

In one embodiment, the directional controller 34 can include a magnetic, analog joystick 36 that is used to select items or otherwise position gaming elements (e.g., the joystick 36 can be used to aim a gun turret 104 (FIG. 6A) for directing objects or firing at targets or other gaming elements during play of skill-based games on the amusement system 10). The analog joystick 36 generally provides more precise or finer control with more responsiveness in comparison to digital controls. The directional controller 34 can include other suitable controllers, however, such as a D-pad, touch-pad, trackball, etc. for selecting/positioning elements, without departing from the scope of the present disclosure.

In one embodiment, the plurality of buttons 32 can include physical buttons that can be engaged by players at the player stations 16 to take specific actions during game play and/or for other functions or operations of the amusement system 10; however, one or more of the buttons can be provided as selectable icons/areas on or about the playfield. The plurality of buttons 32 include a shoot/action button 40 that is used to direct an object, e.g., fire a shot, at a target or other gaming elements (e.g., "Aim and Fire" or "Lock-on" modes) shown on the playfield or to take other actions for directing objects about the playfield. The shoot/action button 40 also can act as an "enter" button to allow players to enter various selections. The plurality of buttons 32 can include a ticket button 38 that is used to redeem credit from the gaming machine 10, e.g., that activates a redeem function that removes or redeems the credit balance of the player station 16. The plurality of buttons 32 also can include a power up button 42 that is used to change the amount of cost or credit used per play. For example, players can cycle or toggle through a predefined list(s) of play costs shown on the playfield to set amounts for each player directed object. Still further, the plurality of buttons 32 includes a menu/change weapon button 44 that can be held down to switch between various play options (such as the "Aim and Fire" and "Lock-on" modes discussed below) or can be engaged according to a prescribed sequence or pattern, e.g., a double-tap or engagement sequence/pattern, to open or otherwise initiate a "Menu" or "Help Screen" and/or other informational features of the amusement system 10.

In some constructions, one or more of the buttons 40 of the plurality of buttons 32 (e.g., the shoot/action button 40, power up button 42, and/or menu/change weapon button 44) can include a plastic flange 46 or lighting ring that surrounds the button plunger 48 as generally indicated in FIG. 3. This flange 46 can be at least partially transparent and can be illuminated by lighting elements/features 30 (e.g., LEDs in communication therewith), e.g., to attract players, identify events in the game, etc. For example, the lighting features 30 can be activated to indicate a specific event, action, enhancement, etc., for a particular play or game sequence (such as to indicate that a target is locked, a target has been obtained or captured, indicate a bonus sequence/period, etc.).

FIG. 3 further indicates that each player station 16 includes additional controls or control elements, inputs, outputs, etc., such as key switches 50/52 for attendant, supervisor, operator, etc. functions; a module 54 that includes a USB charging port 56, and a headphone jack 58 with volume control 60, etc. The key switch 50 can include a lock-controlled switch accessible to attendants to allow for access to restricted menus, allow for troubleshooting, clearing errors, etc. The key switch 52 can include a lock-controlled switch accessible by owners or managers to access secure administration screens, perform specific player station overrides, functions, etc. The USB device charger 56 can include an isolated power port (in some constructions, without any data connection) that allows players to charge mobile devices, such as mobile phones, tablets, etc. or other personal electronic devices, etc., e.g., during, before, or after game play. Though one USB-charging port is shown, any suitable charging port/jack or number thereof can be used without departing from the scope of the present disclosure. The headphone jack 58 and volume control 60 also can allow the player station speakers 28 to be turned down, while still allowing players to hear the games sound effects, music, etc. during game play.

Additionally, the amusement system 10 includes a centralized or host control system 62 (FIG. 4), and each player station 16 has its own control system 64 (FIG. 5) that interfaces or otherwise communicates with the centralized control system 62 to facilitate game play, operations/functions of the amusement system 10, etc. The centralized control system 62 and the player station control systems 64 communicate and interface via a plug-in connector(s) (e.g., USB connectors) to send and receive instructions back and forth to facilitate game play and/or other operations, functions, etc. of the amusement system 10. The centralized control system 62 and player station control system 64 further will provide a distributed, discrete, and scalable input/output (I/O) scheme that allows for plug-in-play and ease of reconfiguration of the player stations 10.

Figure 4:
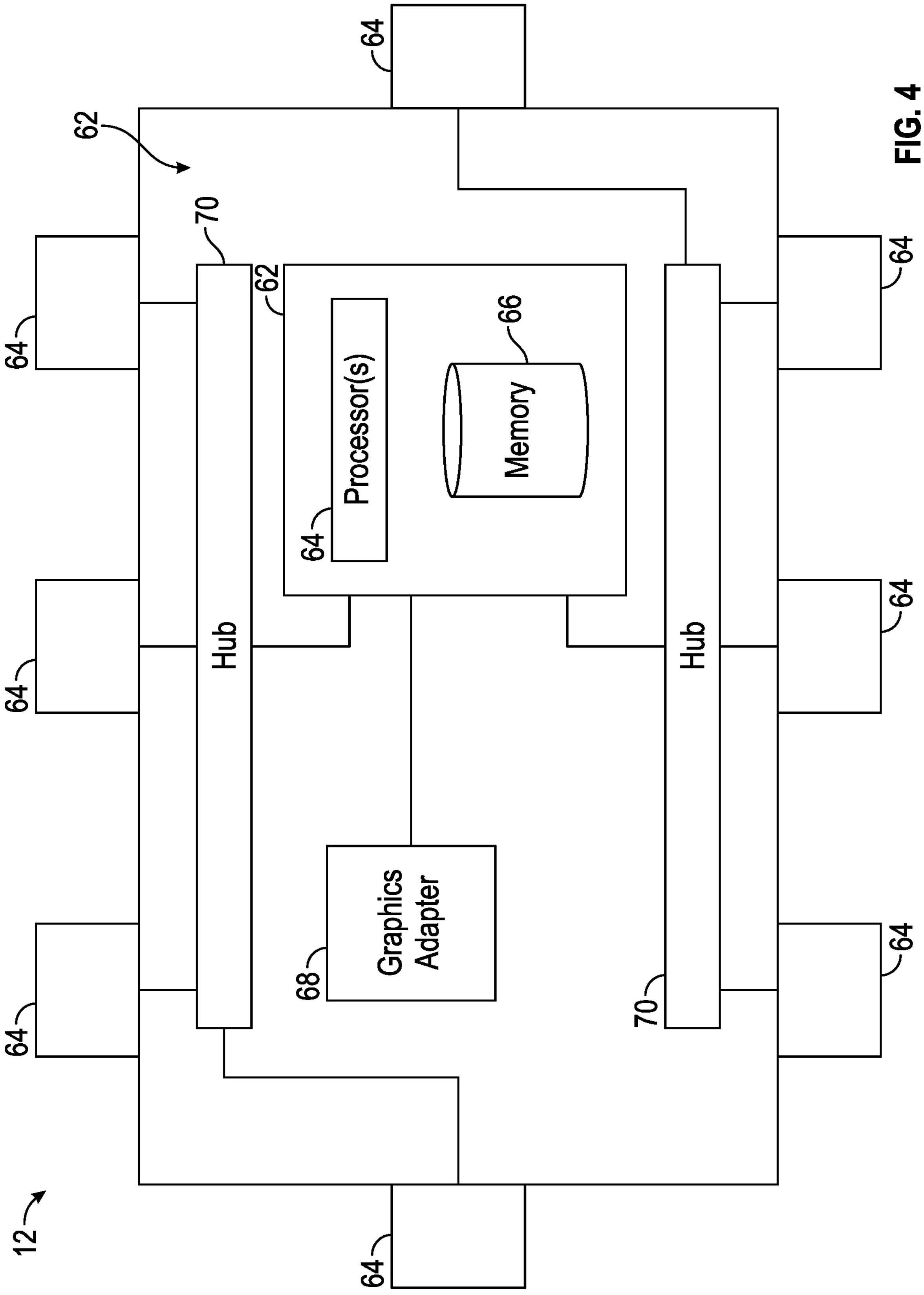
FIG. 4 shows a schematic diagram of a centralized or host control system for an amusement system according to one example of the present disclosure.

FIG. 4 shows a schematic diagram of a centralized control system 62. In the illustrated embodiment, the centralized control system 62 is located within a cavity or chamber 64 of the gaming cabinet 12, and is positioned, at least partially, underneath/below the display 14. The centralized control system 62 includes one or more processors 64 (including microprocessors, CPUs, etc.), and one or more memories 66 (including ROM, RAM, and/or other non-volatile memories) that store instructions, including game rules and/or instructions and other programming, that when accessed and executed by the one or more processors 64 facilitate game play and other operations/functions of the amusement system 10.

In one example embodiment, the centralized control system 62 includes a centralized PC system controller that is based on an AMD AM4 socket, with a Ryzen 5 Processor installed on a B350 based Micro-ATX motherboard with 8 GB DDR4 3200 SDRAM, 16 GB Optane and a 64 GB SSD; however, other suitable computing hardware, etc. can be used without departing from the scope of the present disclosure. The centralized control system 62 further can include a graphics adapter 68, such as a GTX 1080 ti Graphics Adapter or other suitable adapter. Still further, the centralized control system 62 can include one or more hubs 70, such as a pair of USB 3.0 7-port hubs that connect to 2 xHCI controllers of a motherboard of the player station control systems 64. For example, as indicated in FIG. 4, the USB hubs can fan-out to connect to 8 player station control systems 64, which in one embodiment can include 8 DRAX-LIO (Localized I/O) boards as discussed below.

Figure 5:
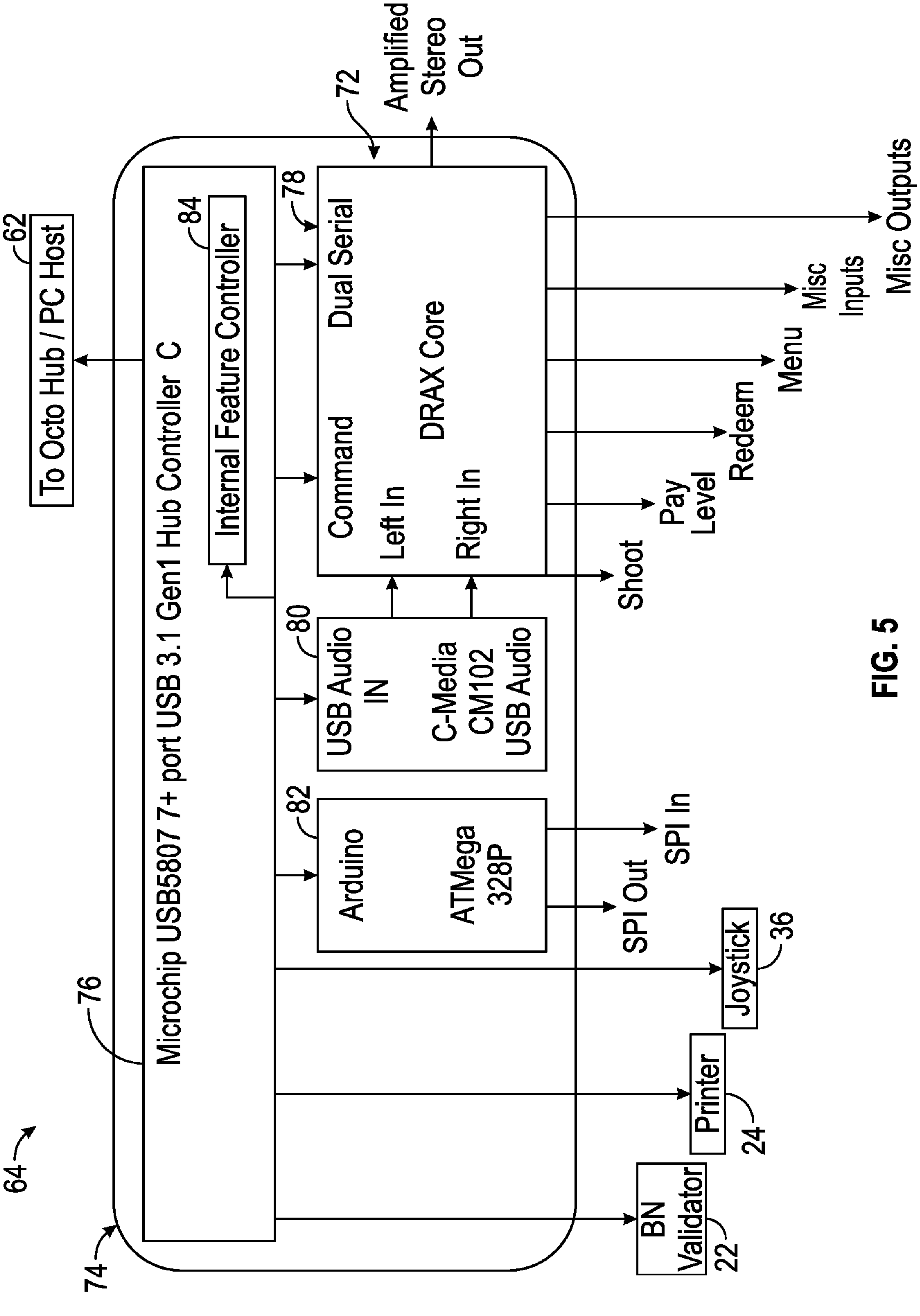
FIG. 5 shows a schematic diagram of a player station control system for a player station according to one example of the present disclosure.

FIG. 5 shows a schematic view of an exemplary player station control system 64. As indicated in FIG. 5, the player station control system 64 includes one or more processors, controllers, CPUs, etc. 72 in communication with the centralized control system 62, the player station controls 18, and peripherals 20 to receive and/or provide command or control signals to facilitate game play and other operations or functions at the player station 16. The processor(s) 72 can generate signals, execute functions, etc. (e.g., for directing targets or objects about the playfield, setting play level or cost, redeeming credits, menu options, other miscellaneous inputs and outputs, etc.). The processors 72 can access and execute instructions, workflow, etc. stored in one or more memories 73 of the player station control system 64 and/or a memory 66 of the centralized control system 62. The processors 72 can execute functions or operations specific to the play station 16 providing a distributed, discrete system architecture. This construction may help to keep the end points for the player station controls and peripherals as short as possible to reduce electromagnetic interface ("EMI") or radio-frequency interference ("RFI") over the gaming cabinet, as well as allow for easier troubleshooting if a player station 16 or its control system 64 is corrupted, damaged, etc. That is, player stations 16 can easily be removed, replaced, and/or substituted without having to shut down and open the game and/or update, repair, replace, etc. the entire amusement system.

In one embodiment, as indicated in FIG. 5, the player station control system 64 can include a DRAX-LIO board 74 with its own hub 76, such as 7-port USB 3.0 hub, to connect a DRAX Cone/Command Channel and Dual RS232 Adapters 78; USB Audio 80; Arduino (LED Control) 82; the joystick 36; the printer 24; and the bill acceptor 22. The hub 76 also can include its own feature controller 84, e.g., a USB feature controller, that can be used to manage features of the hub programmatically from the centralized control system 62. The hub 76 and the centralized control system 62 can be connected by USB, such as a 3.1 Gen 2 type-B USB connection or other suitable USB connection. This discrete I/O connection scheme can use Molex Mini-Fit Jr. connectors, which can be broken out to make button troubleshooting easier. The peripherals 20 (e.g., bill acceptor 22 and printer 24) further can be controlled by the DRAX, through a pair of relays, or other operational components can be legacy DRAX-compatible. The connection of the printer 24 and the bill acceptor/validator 22 by USB can help to substantially reduce, inhibit, or prevent static pulse fraud.

The amusement system 10 also includes one or more gaming platforms or gaming programs that include programming or instructions for one or more skill-based games. The gaming platform can include computer programs instructions, workflows, code, etc. that are accessed and executed by the processors 64 and/or 72 to facilitate play of the one or more skill-based games with the amusement system 10. In additional or alternative constructions, however, the gaming platform(s)/program(s) can be accesses and/or run on one or more personal electronic devices, such as smart phones, tablets, personal computers, etc., to facilitate play of the one or more skill-based games on the personal electronic devices. In one embodiment, the personal electronic devices can be provided at a facility (e.g., amusement center, gas station, grocery store, airport, etc.) and accessed by users for play of the one or more skill-based games, and in other embodiments, users can access and/or download the gaming platform(s)/programs (such as from an application store, e.g., Apple Store®, Google Play® store, etc., or from an available public or private network) to their own personal electronic devices for play of the one or more skill-based games therewith. In the embodiments employing personal electronic devices, the player controls can be provided a selectable icons or areas shown on the display of the personal electronic devices and/or can include physical controls of the devices themselves and/or remote controls in communication therewith.

The gaming platform generally will provide one or more substantially true skill-based games that do not require use of a Random Number Generator (RNG), compensating algorithms, etc., such as is common with many slot-style games and other "games of chance." That is, players generally control decisions on whether or not to take specific actions (e.g., direct objects, initiate game plays, set play costs, make selections, etc.) at any particular time and player skill abilities and/or player strategy determine immediate and long-term outcomes. No aspects of the game that affects the ability to be awarded an award or prize are RNG driven, and no background code runs (e.g., compensation algorithms) that calculate and/or artificially limit the return to a player and/or make it difficult for players to attain awards or prizes regardless of their skills. The gaming platform generally includes programming requiring interaction and the application of player skill and/or strategy to obtain awards or prizes.

For example, one or more skill-based games use multiple screens or multiple elements, features, etc. provided on the display 14 of the amusement system 10 to give the appearance of chance or randomness, though the screens, features, and/or elements are not provided at random, and instead are provided according to prescribed or predetermined patterns or with specific tendencies that can be learned or memorized by players such that players can win based on their individual skill. That is, all choreography, awards/prizes, and/or odds of attainment are deterministic, predictable, and/or pattern-based for potential memorization and/or anticipation by players. In some variations, help text can be provided to players within the game's help screens (e.g., accessed via the menu button 44) to help players understand the game, develop strategies, etc. As a result, players generally are able to use skill to win more than spent over time (i.e., players can have more than 100% return to player percentage ("RTP") over time). Return to player generally includes an amount awarded to a player over an amount or value spent by the player towards the award. That is, an amount or value expended by the player to obtain the award. In this regard, by understanding the rules and game operations and using strategies and tools available during game play, it is possible for players to attain awards or prize values, by exercising of skill, that result in a consistently greater than 100% RTP over time. It is also possible by learning and recognizing target values and effects or results by concentrating on such targets (e.g., building bonus pools faster, getting higher value wins, etc.) for players to strategize and selectively direct objects at targets that guarantee higher rates of Return.

According to embodiments of the present disclosure, a skill-based game can include a single video game playfield (e.g., shown on the display 14 or a display of a personal electronic device) used by players at the player stations 16 of the amusement system 10. The players can join the player stations 16 interactively to compete for awards or prizes made available over time. For example, awards or prizes are generally obtained or captured by shooting targets or other gaming elements moved or directed about the display 14, though some targets may be stationary without departing from the scope of the present disclosure. The targets can be of differing appearances, values, and/or difficulty levels of attainment. Generally, flashier or more agile targets will require more engagements for obtainment/capture, and have higher potential value if obtained (e.g., more difficult a target is to obtain, catch, beat, destroy, etc. the higher reward returned for obtaining the targets). The game(s) can include several target types, with derivations in size, color, appearance, etc. that allow for reuse of targets as lower-value and higher-value targets.

For play of the skilled-based game(s), players generally have to try to hit or engage the targets (e.g., by moving the joystick 36 and pressing the shoot button 40) with objects directed from the player stations 16 about the playfield 100 to obtain awards or win prizes. Each object directed from the player stations 16 generally represents a single game played, and includes a play cost or play amount/level set or selected by players at the play stations 16 for each game played. Generally, players are not forced to direct or release objects or take play actions, i.e., the decision of whether and when to initiate a game play is entirely within each player's control. The player's credit balance and play costs/amount also are entirely within the player's control—that is, the players can cash out at any time, even if no plays have been taken. Objects generally must engage targets to capture or obtain a targets for receiving awards or prizes. In this regard, by directing objects blindly, players may hit one or more targets, but will over time have a lower RTP ("Return to Player") experience. If no targets are hit/engaged at all, the player's RTP % is zero. In some variations, as discussed below, a "Lock-on" mode also is available, e.g., that allows a player to lock on an object to a particular target, but the timing of objects still determines the monetary award value, based on several factors. There further can be targets that should not be engaged, e.g., targets that will incur penalties if engaged (as discussed below) and only through the application of cognitive skill and dexterity of aim and timing can these targets be avoided. In some variations, game play can be very basic, with simple, learnable rules, though more play depth can be added to support deeper play strategies for skill-based optimization.

Figure 6A:
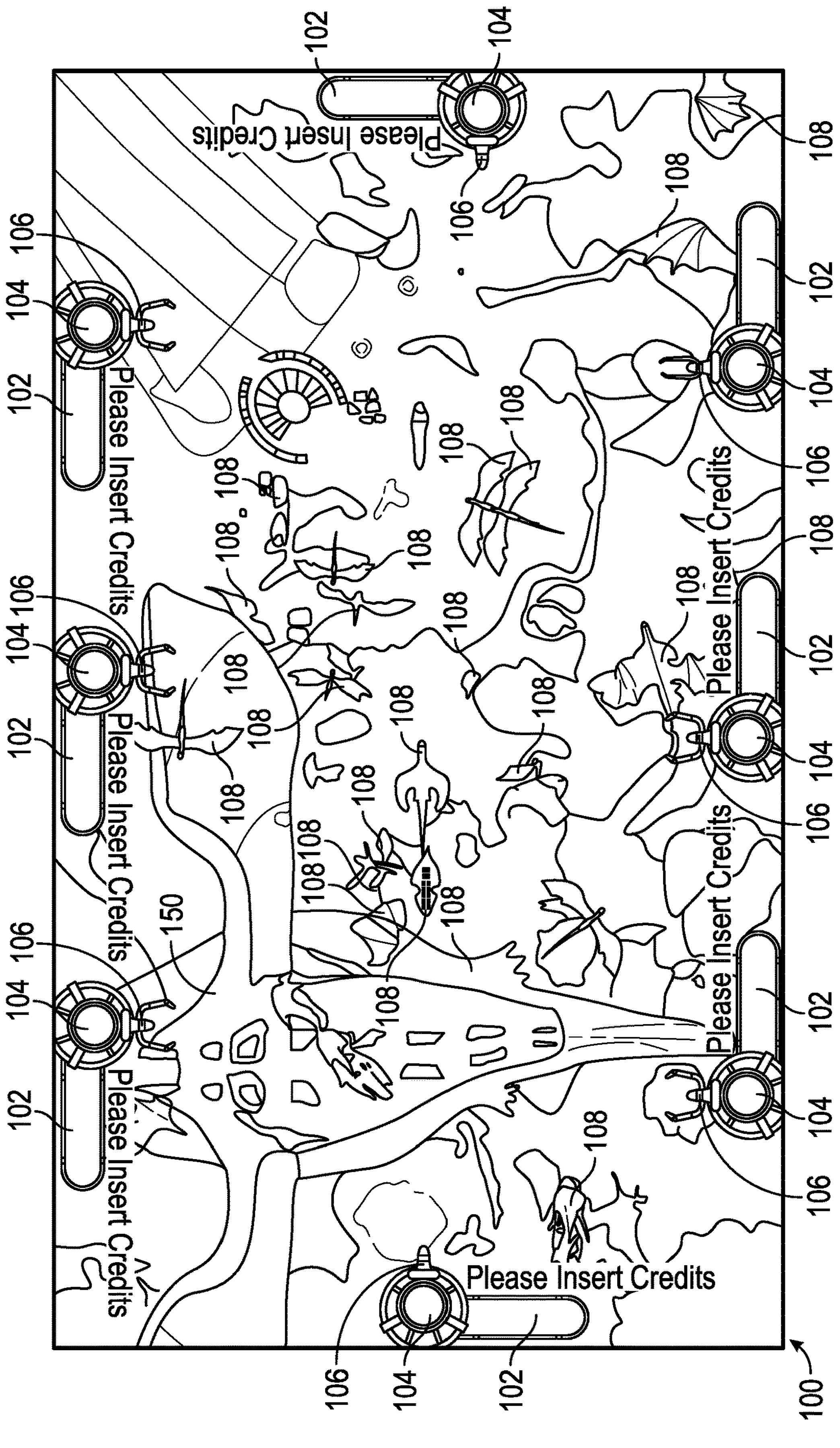
FIGS. 6A, 6B, 6C, and 6D show exemplary screen shots for a skill-based game for an amusement system according to various examples of the present disclosure.
Figure 6B:
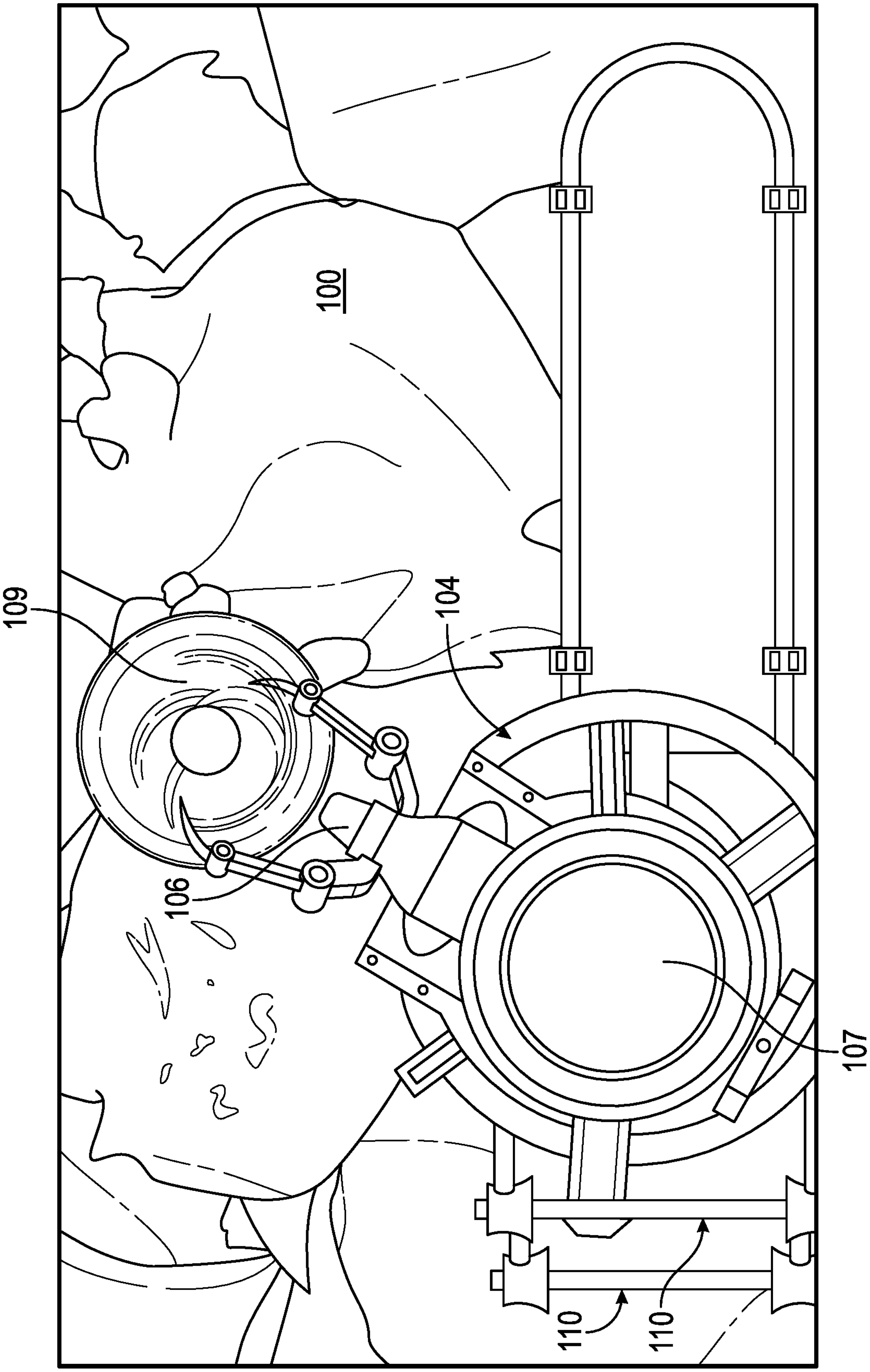
Figure 6C:
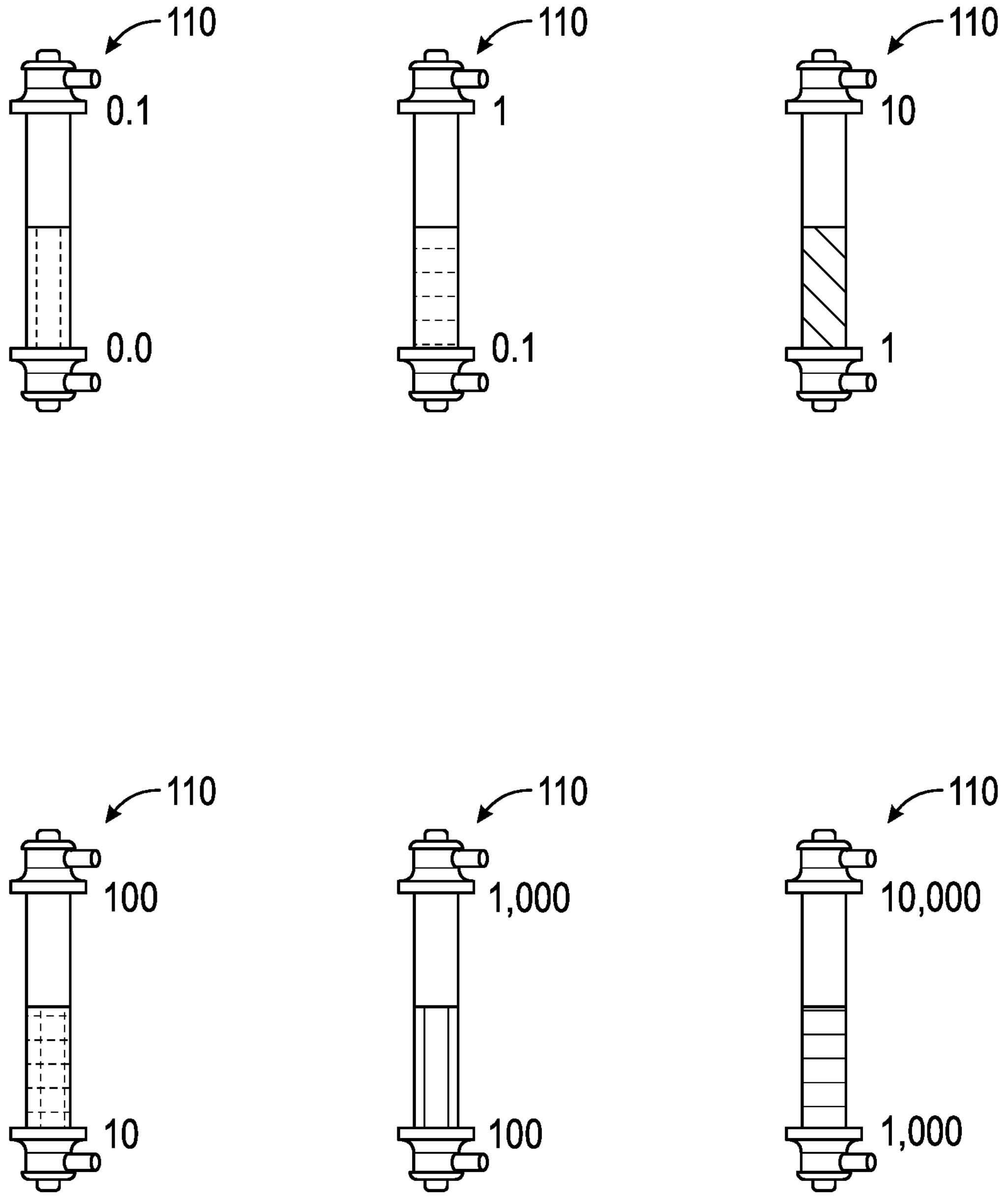
Figure 6D:
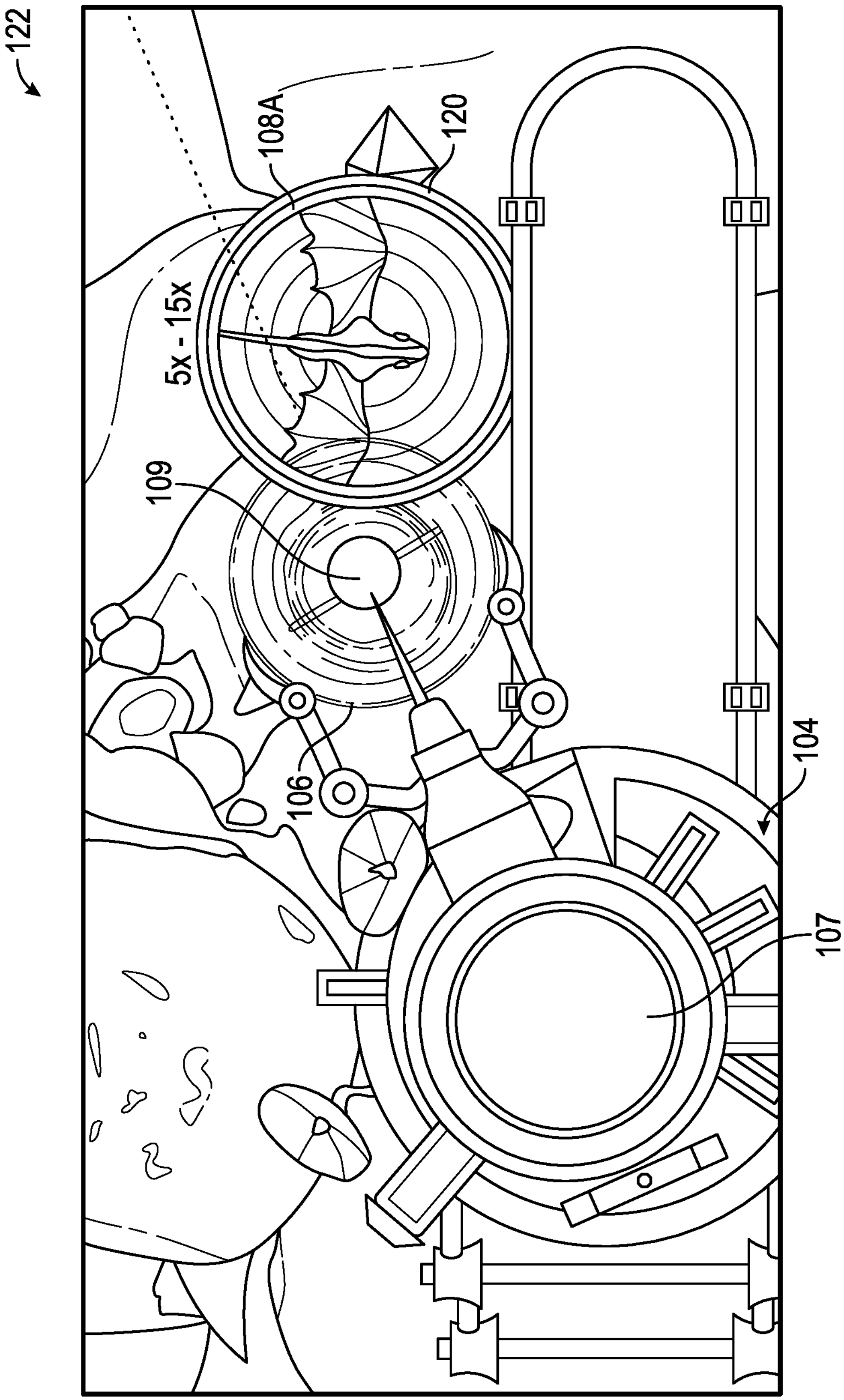

FIG. 6A shows an exemplary playfield 100 of a skill-based game according to the present disclosure. The playfield 100 is provided on the display 14 of the amusement system 10. As indicated in FIG. 6A, each player station 16 surrounding the periphery of the playfield 100 can include an on-screen information bubble 102 and a moveable firing mechanism or pointer, shown as a gun turret 104, for directing objects about the playfield 100. In the illustrated embodiment, each turret 104 includes a gun 106 that can be aimed, e.g., to the left and right, or otherwise positioned to direct a trajectory of objects (e.g., using the analog joystick 36). The current play level (cost per play), which is set/selectable by the player, can be displayed by an indicator 107, e.g., image, screen, etc., at the center of the turret 104 (FIGS. 6B and 6D). Awards or prizes can be associated with shooting, capturing, or otherwise obtaining targets 108 that appear to move at random across the playfield 100 and have differing appearances, values, difficulty levels of attainment, etc.

Generally, larger, flashier, or more agile targets 108, which will be difficult to obtain, will have a higher potential values if obtained, and the targets 108 and playfield 100 can have a theme or prescribed design, for example, as shown in FIG. 6A, the targets 108 can take on the appearance of dragons having a variety of physical characteristics, though any suitable targets or themed characters, such as birds, ores, dinosaurs, or other suitable cartoon characters, fantasy characters, mythological creatures, animals, etc., and/or other gaming elements can be used without departing from the scope of the present disclosure.

In the illustrated embodiment, the player directed objects or actions directed from the player stations 16 are represented as shots fired from the turrets 104, and can include, but are not limited to, arrows, bullets, energy balls, laser blasts, etc. or other suitable projectiles shot or launched from the turrets. However, the objects or actions can include other suitable objects, gaming elements, or other suitable actions to be directed at the targets, such as fishing reals, nets, grab hands, catapults, thrown objects, etc., without departing from the scope of the present disclosure.

Every player directed object from the player station (e.g., shot fired from the turret 104) generally constitutes a complete game play of the game once a final disposition of the player directed object is determined, and players thus have the ability to play several games per second. Also, each player directed object typically can be selected by the game or the player to have a prescribed cost, level, or value, such as 1 credit (e.g., $0.01, $0.10, $1.00, etc.) so that each player directed object costs 1 credit (e.g., $0.01, $0.10, $1.00, etc.)) and there is the potential to advance towards a prize or award with every player directed object from the player station 16. Most targets 108, however, will take multiple object engagements to capture or obtain an award/prize; though in some variations, special 1-hit targets can be provided, as described in more detail below.

Generally, no aspect of the game that affects the ability to obtain or capture a target or otherwise be awarded an award or prize is Random Number Generator ("RNG") driven, which generally is defined as a non-deterministic sequencing of outcomes, but is not the same as a predefined sequence of variable values that repeats and can be recorded for future recall. A player may not know or recognize specific gamine sequences or variable values the first time the player is exposed to them. However, the sequences/values are available as something to be learned or memorized as they repeat over time and multiple rounds of the skill-based game are played. Thus, by observation, players can learn, memorize, and/or anticipate game traits or sequences. Rules or instructions for the game play also are provided (e.g., by accessing the help menu via menu button 44) to help educate players on different targets and values to obtain such targets, e.g., to enable development of play strategies.

Figure 7A:
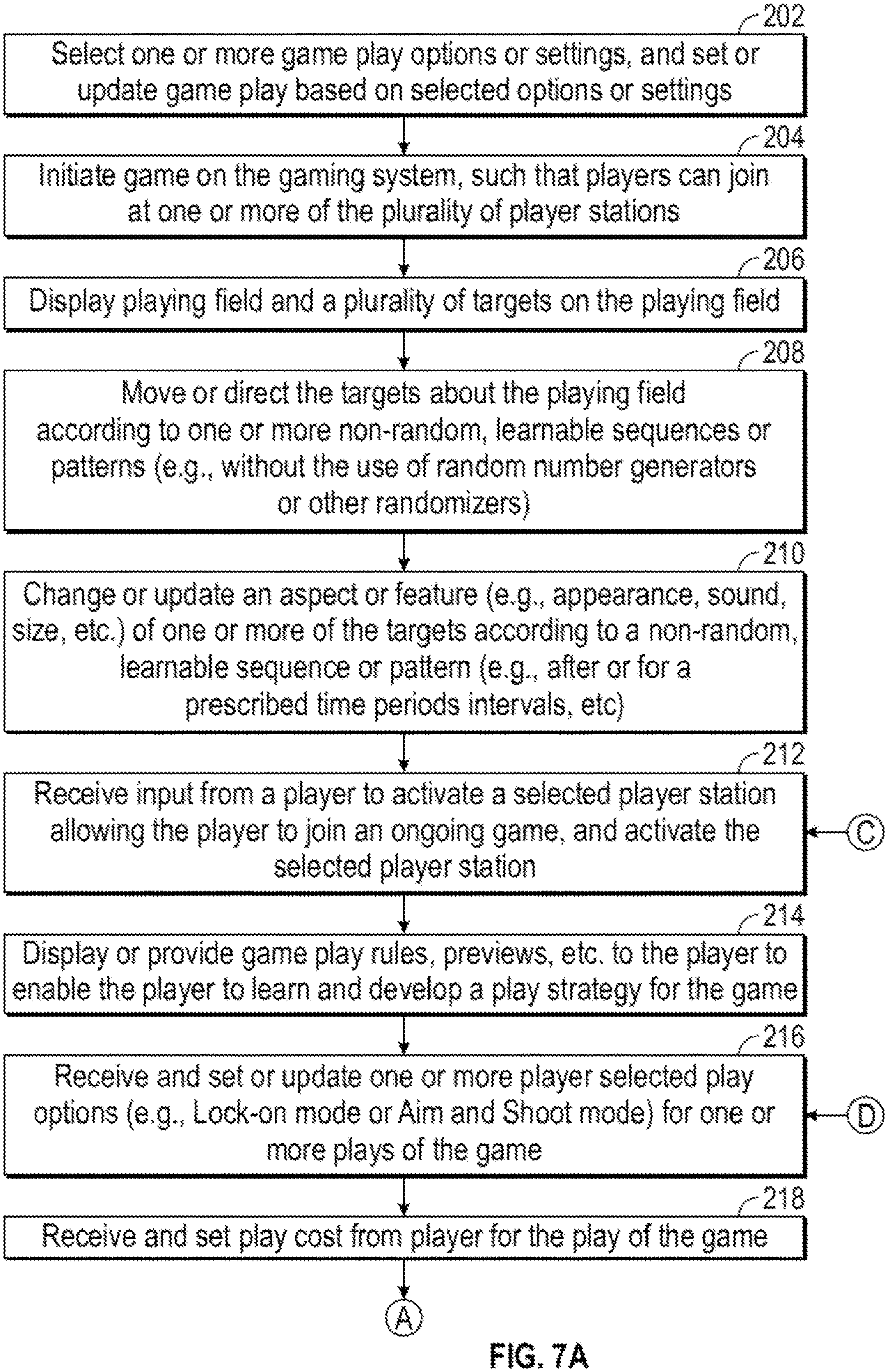
FIGS. 7A, 7B, and 7C illustrate a process flow diagram for a skill-based game for an amusement system according to principles of the present disclosure.
Figure 7B:
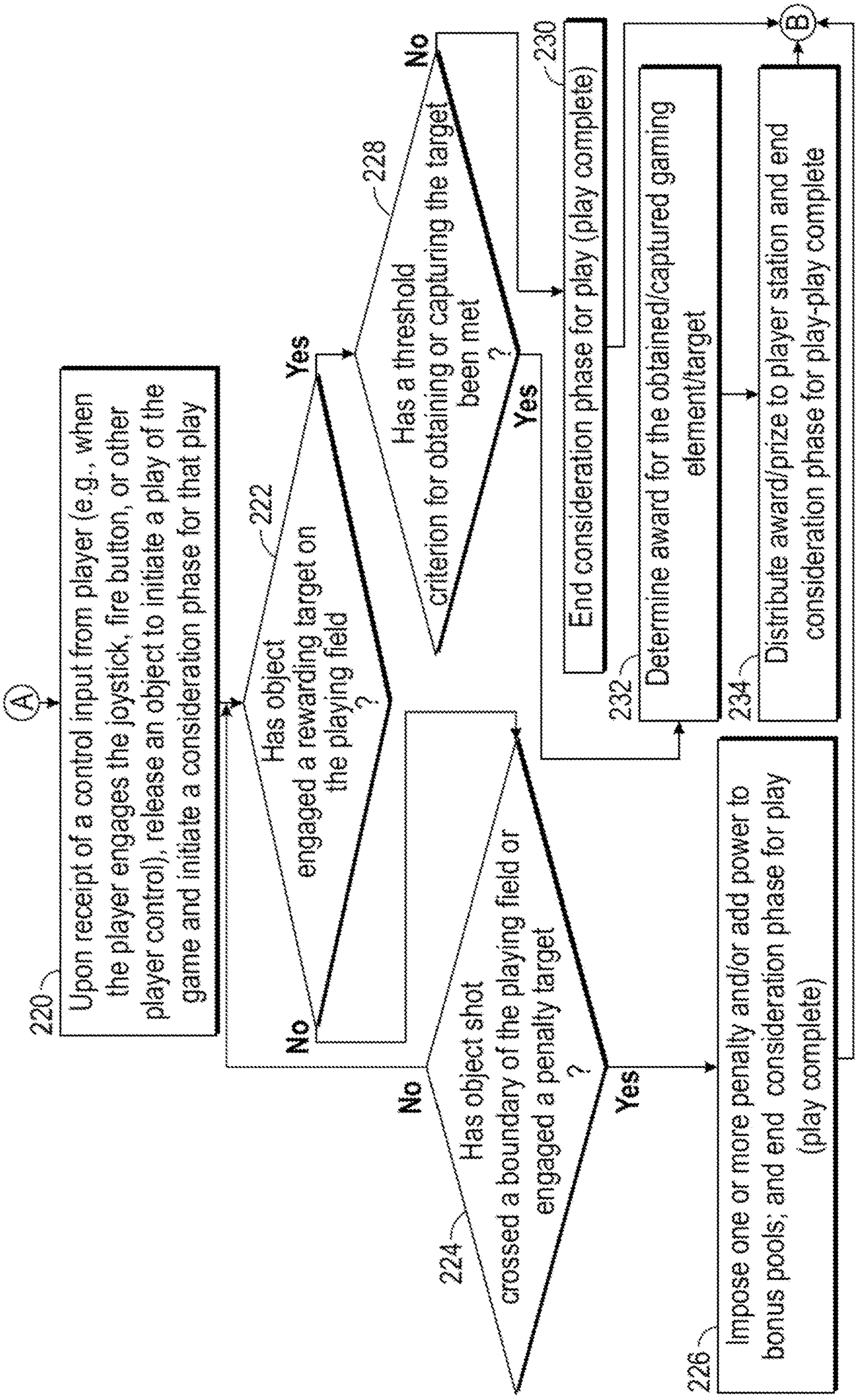
Figure 7C:
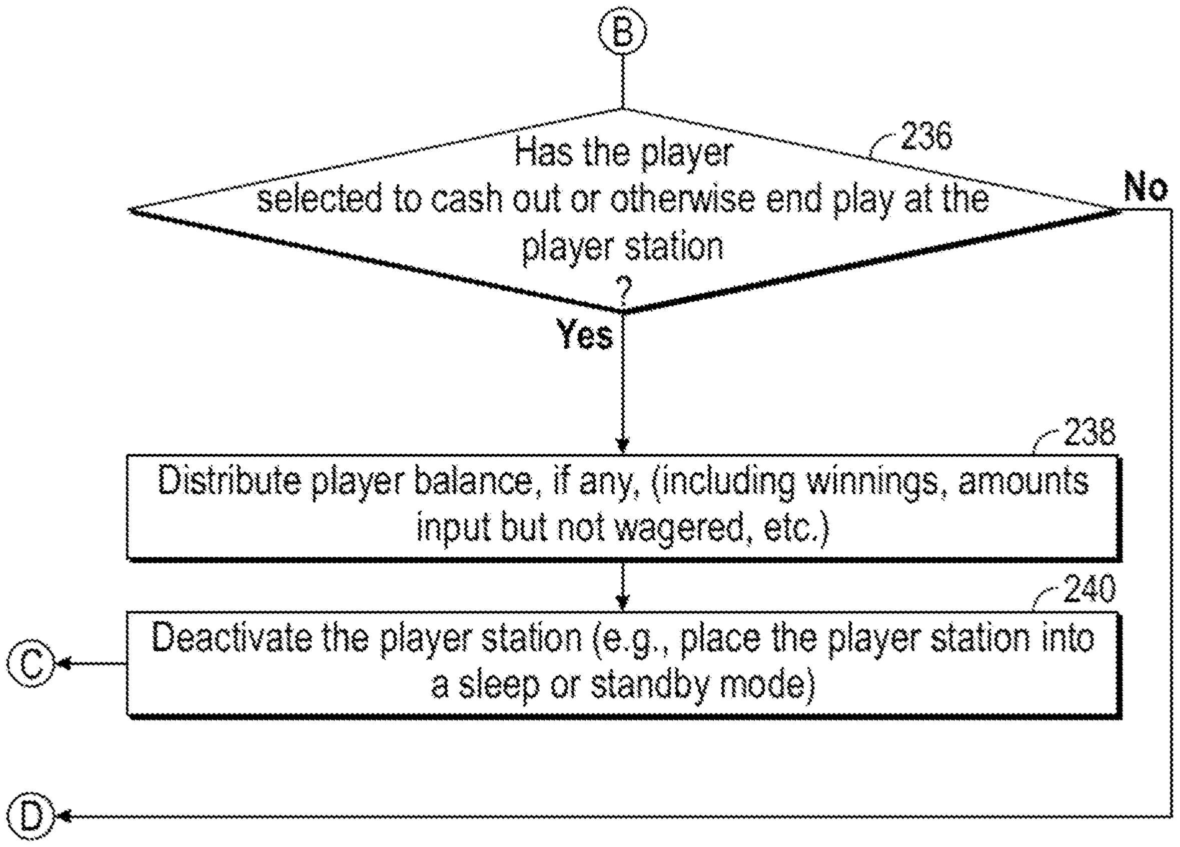

FIGS. 7A-7C provide a flow diagram for operation of a skill-based game on the amusement system 10 according to principles of the present disclosure. As shown in FIG. 7A, one or more game play options or settings can be selected, e.g., by system operators or administrators, and rules, regulations, etc., for game play can be set or updated based on these selected options or settings (at 202). For example, game play rules, such as minimum costs per play, firing rates, object trajectories, etc.; target rules, such as individual or communal modes for target obtainment/capture, target payout percentages or multipliers, etc.; or other game rules or regulations can be set by system operators or administers.

The skill-based game can be initiated on the amusement system 10, such that players can join the game at one or more of the plurality of player stations 16 (at 204). The playfield 100 and a plurality of targets 108 also are displayed on the display 14 (as indicated at 206). The targets 108 are moved or directed about the playfield 100 according to one or more non-random, learnable sequences or patterns, e.g., without the use of random number generators or other randomizers (shown at 208). In this regard, a series of differently identifiable targets are presented and about the playfield 100, with each target 108 moving along a non-random, predictable path based on information or instructions stored in memory (e.g., memories 66 or 73 or a memory of a personal electronic device), and with different ones of the plurality of targets associated with different meta or sub-games defined by a series of game instructions or rules stored in the memory and accessible by players at the player stations. Generally, more agile and/or fleshy targets, which will be more difficult to obtain, can have higher award values in comparison to other targets. Further, as the targets' movements are not randomized, skilled players can learn, memorize, and/or anticipate movements of the targets 108 about the playfield 100.

As indicated at 210, the amusement system 10 can change or update one or more aspects (e.g., appearance, sound, size, etc.) of one or more of the targets, e.g., continuously or dynamically according to non-random learnable sequences or patterns, such as after or for prescribes time periods, set intervals, etc. that are learnable by the players.

FIG. 7A further shows that the amusement system 10 receives an input from a player to activate a selected player station 16, which allows the player to join the skill-based game on the amusement system 10, and upon receipt of this input, the selected player station 16 is activated, with the player being allowed to join an ongoing skill-based game on the amusement system (at 212).

In addition, the amusement system 10 can display or provide game play rules, instructions, previews, etc. (e.g., upon the selection of the menu button 44 or other player controls) to the player at the plater station 16 to enable the player to review the rules, instructions, and/or learn target sequences/patterns, etc. for developing one or more game play strategies (as indicated at 214).

The game system 10 further can initiate one or more peripheral devices (e.g., audio, visual, etc.) to correspond to events in the game, e.g., target events, bonus sequences, penalties, etc., as indicated at 216. For example, the peripheral devices 26 will be activated to correspond to targets events or characteristics, such as capturing/obtaining or hitting of targets, providing specialize target signatures, such a screams or other unique sounds corresponding to one or more targets, etc.

As further indicated at 216, the amusement system 10 receives and sets or updates one or more player-selected game play options, such as a "Lock-on" mode or an "Aim and Shoot" mode, set by the player at the play station 16 for one or more plays of the game. The amusement system 10 further receives and sets costs or play levels from the player for game plays at the player station, for example, a cost or level for each game play, such as $0.01, $0.10, $1.00, etc. (as generally indicated at 218). Players also can set power values for a specific player directed object, though these power values may be set or modified automatically according to game rules, such as using a volatility enhancement script as discussed below.

FIG. 7B further shows that, upon receipt of a control input from the player, such as when the player engages the joystick 36, fire/shoot button 40 or other player controls, the amusement system 10 releases an object (e.g., fires a shot) initiating a play of the game (e.g., initiating a consideration phase for a game play associated with the player directed object), with each player directed object, e.g., shot fired, generally representing a single play of the game (as indicated at 220).

The amusement system 10 determines whether the player directed object has engaged a rewarding target moving across or otherwise on the playfield 100 (at 222). The amusement system 10 further determine whether the player directed object has crossed a boundary of the playfield or engaged a penalty target (at 224). If the object has not crossed the boundary of the playfield 100 or engaged a penalty target, the amusement system 10 will continue to look to whether the object has engaged a rewarding target on the playfield as indicated at 222. However, if the object has crossed the boundary of the playfield or engaged a penalty target, the amusement system 10 will end the consideration phase for that particular play—that is, the game play associated with that object will be complete (at indicate at 226). Optionally, for objects that cross a boundary of the play field or engage a penalty target, the amusement system can impose a penalty and/or add values (e.g., a portion of the play cost and/or power value) associated with the object to one or more player bonus pool available to other players.

As shown at 228, if the amusement system 10 determines that the object has engaged a rewarding target on the playfield, the system 10 will determine whether a threshold criterion for capturing or obtaining the target has been met, e.g., if a power level of the target (less the object power value of the engaging object) is at or below a threshold value, e.g., 0%, 5%, 10%, etc., which can be set by system operators/administrators, e.g., if a power value associated with the object is at or above a predefined threshold for obtaining the target, etc., or combinations thereof. If the threshold criterion for capturing/obtaining the target has not been met, the consideration phase ends, as shown at 230, with that particular play being complete (and the process continuing to 236 in FIG. 7C).

However, if the threshold criterion for capturing/obtaining the target has been met, the amusement system 10 can determine or allocate the appropriate award or prize for the obtained or captured target at 232, and distribute winnings to the player station from which the object was directed (at 234). This ends the consideration phase for the game play and completes the play of the game.

As also indicated in FIG. 7C, when the amusement system 10 determines that the player has selected to check/cash out or otherwise end play at the player station 16 (at 236), the amusement system 10 will distribute the player balance (at 238), if any, including awards/prizes, costs inputted and not played, etc., and the amusement system 10 can deactivate the player station 16, e.g., place the player station 16 into a sleep or suitable stand-by mode as generally indicated at 240. If the player has not selected to cash out or otherwise end play as determined at 236, the amusement system 10 will continue to wait for player input at 212 as shown in FIG. 7A.

In some embodiments of the present disclosure, the skill-based game(s) can employ pre-scripted target spawning sequences as well as deterministic rules for target trajectories. For example, spawn sequencing over time can be determined by rules that ensure the correct quantity of targets and the correct mix of target types. As an example, if only one specific target type (e.g., a high-value/jackpot or other specialized target) is allowed on the screen at one time, a second target of the same type (e.g., a second high-value/jackpot target) will not come out/appear until the first specific target type is captured, obtained, times out, etc. In some variations, the amusement system 10 can have an open-loop, time-based release system for targets. In this regard, it generally will be understood that if a rule is too complex for a "normal person" to understand, i.e., a high-level math formula, then it cannot have more than a small impact on long-term RTP. In some variations, the amusement system 10 may not use any high-order math rules or other complex algorithms for spawning sequences and/or target trajectories.

The targets generally will move along a non-random, predictable path or trajectory that is learnable, memorizable, and/or can be anticipated by players. In one variation, the non-random, predictable path generally will not change until the target has been obtained or captured. In other variations, the targets may move along multiple, non-random, predictable paths dependent upon one or more gaming events. For example, a target may initially move along a primary or initial path or trajectory, and when the target is engaged by one or more objects, the target path or trajectory can be modified to a secondary, non-random path or trajectory, which is identifiable, recognizable, and/or scientifically different from the primary path or trajectory. Further still, if the target (moving along the secondary path or trajectory) is engaged by one or more additional objects, the target path or trajectory can be modified from the secondary path or trajectory to an additional path or trajectory (or alternatively can be returned to the primary path or trajectory). The path or trajectory of the target can be further modified or updated based upon additional, subsequent object engagements or other game events. Each of the non-random, predictable paths will be learnable, memorizable, and/or can be anticipated by players, and further players may be able to learn, memorize, and/or anticipate the different sequences of paths based on object engagements. That is, a player may be able to anticipate the changes or differences in movements/directions of the targets between the various trajectories or paths and use this to the player's advantage to obtain or capture targets, or to get other players' objects to go off-screen. More specifically, when a target is engaged by an object, a skilled player knows or recognizes that the path or trajectory of the target is going to change, e.g., to the secondary or additional path or trajectory, and by knowing the secondary or additional path or trajectory, the skilled player can anticipate these movements to their advantage to increase the likelihood that the player will obtain the target or to prevent other players from doing so. Object engagements may not be the only event to change or modify the path or trajectory of the targets and other game events, e.g., during level changes, specific gaming sequences or time intervals, etc., may cause the target trajectories or paths to change. Each of these events generally is learnable, memorizable, or can be anticipated by players, such that skilled players can increase the likelihood of obtaining/capturing targets through the use of knowledge or skill.

In addition, according to the present disclosure, multiphasic, meta-game play ("MPG") or sub-game play can be employed by the amusement system 10. In particular, MPG may describe the multiple phases or sub games of a "single" game for purposes of accounting, as well as the multiple single actions that make up an MPG game. MPG also can be reference as meta-games or sub-games, when the perspective is from a target and is comprised of multiple single player directed object events. That is, different ones of a plurality of targets can be associated with different meta or sub-games defined by a series of game instructions or rules. Meta-games generally can be shared events over the entire amusement system 10. For example, when a player directed object is released, a play begins, which can be referred to as a consideration phase. When the player directed object misses and/or goes off-screen, that concludes that play, as a loss. However, if the object engages a target, a meta-game can be initiated for purposes of accounting statistics and recall history. Each target instance can have a specific identifier (e.g., a GUID or other identifier), and events related to a specific target can be tagged with that target's identifier for record sorting. As a player directs multiple objects at a target, each object can be recorded as a game played, but is also considered part of the meta-game/sub-game for that target. Furthermore, missed objects that occur during the meta-game/sub-game are stand-alone games and not attached to the meta-game/sub-game. The meta-game/sub-game generally ends when the specific target is obtained, and the player that obtained or captured the target generally receives that particular target's award or prize with the other players winning nothing or having no payout with respect to that target (though in some instances, other players may also be awarded an award or prize). The amusement system 10 further can display or log the total cost the player spent to obtain or capture that target, while displaying or logging that the other players won nothing (or a reduced award).

Each player station 16 further can include a recall history that includes both the individual player directed objects (e.g., a minimum of the last 100 to about 1000 objects or more) within the meta-games/sub-games the player station 16 was involved in. In addition, or in alternative variations, the recall history can show the meta-game/sub-game events from the perspective of a target, e.g., showing all the player directed objects that were involved with a specific target. The recall history can be stored in one or more data stores or databases associated with the player station 16, which can be resident in memories 66 or 73 or other memories in communication with the amusement system 10, and can be accessed by the players through the menu. The platform also may, or may not, have a relational database, and in some variations, the platform can include a streaming file object, with only limited recall history capability and/or even no recall history.

Game play further can be subdivided into multiple levels that can provide certain unique features, such as a background image that sets a tone, theme, etc.; background music that supports the tone, theme, etc.; a focus on a particular type of target; one or more level-specific targets, e.g., high-value, boss or jackpot targets, etc. Each level of the game also can be a relatively self-contained play session. Each level also can be designed with a theme, a set of feature targets, including special targets, e.g., a Boss, and special power-ups appropriate to the theme. The levels further can last only for a prescribed time period, e.g., a level can last between about 10 minutes and about 20 minutes, such as about 12 minutes, with 8 players; though with a single player, a level may last much longer. At least some target characteristics, such as target power levels, can persist between various levels of the skill-based games; however, one or more of the target's power levels can be reset or otherwise modified between each level, without departing from the scope of the present disclosure. One or more transitions further can be displayed on the playfield between each level. The devices 26, i.e., sound 28 and audio 30 features, can be activated to indicate a change between levels, e.g., a specific sound or lighting sequence or pattern can be played to indicate a transition between levels.

In addition, targets 108 can include multiple target classes or types that range from small to large. Each target 108 can be considered its own, stand-alone game, with a defined average RTP % ("Return to Player"). Some targets have a very low level of volatility and others have a relatively high level of volatility. However, all targets are designed to pay out more than 100% RTP in the event of an appropriate play strategy. The overall average RTP % for average skill play may be less than 100% as different players likely will have different skill levels and strategies. Further, skill-based outcome modifiers can be used as the primary mechanism to add apparent volatility and advanced skill strategy that can enable a player to get a better than 100% RTP over time. Such modifiers could include feature cycle matching and/or volatility enhancement scripts with a preview function, as described in further detail below.

In general, targets 108 have a pre-defined initial power level or attainment value (also referred to as a health power ("HP") value) at spawn (e.g., for per-player health-based capturing), such as pre-defined initial power values at spawn (i.e., when the target initially appears on the playfield 100). In addition, each player station 16 further can have one or more player bonus pools used to assign specific object power values (also referred to as Magic Power "MP" values) to objects and/or object values for funding future awards. In one embodiment, each player's turret 104 can apply specific object power values stored in a player bonus pool that can determine how quickly a particular player station 16 is able to capture/obtain targets. That is, object power values of objects engaging targets reduce or subtract from the targets' power levels, and when a target's power levels are at or below a predetermined threshold value, the target is obtained or captured by the player station 16 that released the object to bring the target's power level to or below the threshold value.

In some embodiments, target capture or obtainment will be determine based on additional or alternative threshold criterion. For example, a power value associated with the object may need to be at or above a predefined value assigned to a particular target for the target to be obtained/captured. This power value for the object is generally determined by the level of or amount in one or more player bonus pools assigned to the player station. In one variation, each player station can have a plurality of player bonus pools associated with different target classes. That is, each of the targets can part of a specific target class or super class of a plurality of predefined target classes, and each player station can have a player bonus pool associated with each of the various target classes. Target classes can be defined at least in part by the difficulty of obtaining the targets therein. These respective player bonus pools generally are filled or assign object power values based on object engagements of targets within the class associated therewith. For example, each time a player directed object engages a target, the player bonus pool corresponding to the class or super class of that target can receive some amount of object power. Further, the required object power value for obtaining/capturing a target can be determined based on power values awarded for previously engaged targets that are part of the same predefined target class as the engaged target. That is, the object power value for a particular target is determined based on a player bonus pool for the class or super class associated with the particular target. For example, when an object engages a target, the system 10 may determine or identify the specific class associated with that target and also determine or identify an amount of object power available (e.g., based on a player bonus pool associated with the specific target class) or assigned to an object for the class of target that was engaged. Further, if that object amount is at or exceeds a threshold value for capture or obtaining that target (or class of target), the player will be awarded for the obtainment or capture of the target.

In even further variations, the threshold criterion for target obtainment/capture may require a power value associated with the one or more engaged targets to be at or below a predetermined threshold value, and in addition to this, a power value associated with the one or more objects to must also equal or be greater than a predefined threshold value for obtaining the one or more engaged targets (or targets of that class of target).

An object power value indicator for each player station 16 can be provided on or otherwise along the playfield 100, e.g., substantially next to or adjacent the turret 104. The players thus generally will always be able to see the possible object power value of the next object 109, before it is taken. In one embodiment, players can see the power value of their next object in an indicator 110, e.g., vials or containers, shown on the playfield (FIG. 6B). The vials or containers (indicators 110) further may correspond to the respective target classes or super classes. Also, players can access the help menu (e.g., via menu button 44) to view the object power values of their subsequent available objects (e.g., the next five objects) to enable players to strategize accordingly.

In some embodiments, a Volatility Enhancement Script ("VES") with a preview function is employed for determination of object power values. In particular, a VES can include a long list of numbers that repeat in sequence and average, and that can be mapped to the object power value in the amusement system 10 and displayed on the playfield 100 as indicators 110. The indicators 110 further can have a specific appearance, e.g., the vails can be filled with different color fluids, to indicate varying levels of objects values that are available to the player at the player station 16. For example, the indicators 110 shown in FIG. 6C will have a different appearance, e.g., a different colored fluid, teal, purple, green, yellow, red, magenta, etc., to indicate the object values available at the player station 16. FIG. 6C further indicates that the color of the object indicates the magnitude of the shoot power available, e.g., 0.0 to 0.1, 0.1 to 1.0, 1 to 10, 10 to 100, 100 to 1,000, 1,000 to 10,000, etc.

The amusement system 10 can create volatility by setting up spikes or waves in the VES that makes it possible to reduce or increase the quantity of objects required to capture a target. There is a skill component to VES in that players can recognize and memorize the object power values observed over time, since patterns of spikes and waves generally will repeat over and over, substantially without derivation from the pattern. Players can learn to capture higher valued targets when a spike or wave is present; or use the fact that the object power value is filled to an optimal or maximum value (also referred to as a VES value) before an object is released. The object value in the next, unreleased object is thus known to the player, such that timing and aim can be used to great advantage to maximize the effect of the increased object value. The VES script can be sequenced in a non-randomized straight sequence loop over and over for each player station 16. The script may be more than a million elements long, and only may advance for each player directed object. The overall average of all the values in the script is the normalized object power value (e.g., such as about 1×, 1.1×, 1.2×, or more). In additional or alternative embodiments, additional VES may be enabled in select configurations that affect the monetary award/prize values.

In some variations, the game further can have a "Preview" mode that allows players to preview an upcoming level or sequence of upcoming screens so that players can make a determination on how or whether to player in the upcoming levels/screens. For example, the "Preview" mode include showing a preview screen on the display showing target types, the number of targets, their movements, etc. that will be shown on the upcoming screens/levels. In some variations, the game further can have a "Preview" mode that allows players to preview an upcoming level or sequence of upcoming screens so that players can make a determination on how or whether to player in the upcoming levels/screens. For example, the "Preview" mode include showing a preview screen on the display showing target types, the number of targets, their movements, etc. that will be shown on the upcoming screens/levels.

Moreover, portions of the object power value and/or the cost of missed objects can go towards player bonus pools that gets paid out or otherwise provided to player stations 16.

Accordingly, missed objects can be the mechanism by which novice players are not fully, but rather partially, penalized, for inadequate skill and/or ineffective strategy. Missed objects can come from multiple sources and can be treated differently in terms of how much of a percentage of the object cost is going to be potentially returned. For example, if an object crosses a playfield boundary or goes off screen, an off-screen penalty can be imposed that results in loss of object values that may be made available to other players. Also, certain targets, e.g., penalty targets can result in a loss of object values if they are hit. Further, when a player directs an object that does not go off-screen or does not engage a target that causes loss of object value, the value of that object can be infused back into the player's turret, increasing its potential object value for subsequent objects. A player may also be awarded target object values for player directed objects that engage but are not sufficient to obtain/capture a particular target. These object values further may be assigned to a player bonus pool associated with the class or super class of the engaged target.

In general, players want to avoid wasting their highest valued objects on risky maneuvers, such as shooting a target near the edge of the screen, or trying to spoil another player, since if you accidentally shoot off-screen, they will be donating their object power value to other players. Furthermore, players want to avoid shooting high valued objects at targets that can be captured with a single object even when their turret 104 is not infused with any increased object power value at all. Players further can see the object power value they will earn from capturing a specific target on top of their turret 104 (e.g., whenever they switch to a "Lock-on" mode). In one embodiment, if a player currently has 30 units of object value and gets a 100% feature match (feature matching is detailed further below and shown in FIG. 9) when an object collides with a target 108 that provides additional or bonus object power values, then the player's turret 104 will be infused with 40 units of object power value. Further, the turret 104 may be infused with enough object power value that it matches or exceeds the power value of the chosen reward and the player is will you be able to actually capture the target. Players generally will keep track of how much object power value is currently infused in their turrets 104, as this is not something they will want other players to be able to easily learn. Players can do this by paying attention to the results of player directed object. One winning strategy can be to keep track of a turret's object values but keeping it a secret from other players to make it much easier to steal targets.

The higher the initial power level of a specific target 108, the more objects it generally will take to capture that specific target 108 depending on their object power values. Each target also can have a power level or health register assigned to each player station 16. For example, a target will have up to 12 health registers for a 12-player machine. Generally, all players need the same number of objects to obtain a target, regardless of the play level. However, as discussed, object power values/multipliers can impact the number of objects needed. Each player has to hit the target enough times to deplete the target's power level to or below a prescribed threshold, e.g., 0. For example, if a first player has hit a target 7 out of 10 needed times and a second player gets all 10 and obtains the target's award, the object power value (or a portion of the cost amounts) for the 7 objects from the first player can go to a player bonus pool. These object power values can go to the play bonus pool of the second player station 16 for use in future objects; however, in some variations, the object power values can be provided to a player bonus pool accessible to other players. The amusement system 10 also can provide multiplier based awards and the power value of a target is a multiple of the total amount spent by the player that captured the target. For example, higher object costs generally do not deplete a target's power value faster, and generally only the award value is adjusted and is a multiple of the total cost (for a particular object) by the player that captured the target, while at least a portion of all the other players' contributions are distributed to player bonus pools. As discussed, in some variations, an object value associated with an engaging object also may need to equal or exceed a prescribed threshold for obtainment or capture of some targets (or target classes/super classes).

According to embodiments of the present disclosure, the skill-based games further can allow for selection of mode configuration options to establish whether target power levels are in an individual mode or a communal mode. If an individual mode is selected, each player has to, on their own, drain a player station-specific power level register for a target. If set to a communal mode, however, then all objects from all players go to a set of power level registers that are centrally managed for a specific target. In the communal mode, the objects thus contribute, in some way, to the power level drawdown of the target, and in the communal mode, players can be allowed to steal or cherry-pick targets (e.g., one player may have hit a target several times but another player can steal the award for that target by hitting it only one or less times than other players).

Figure 8:
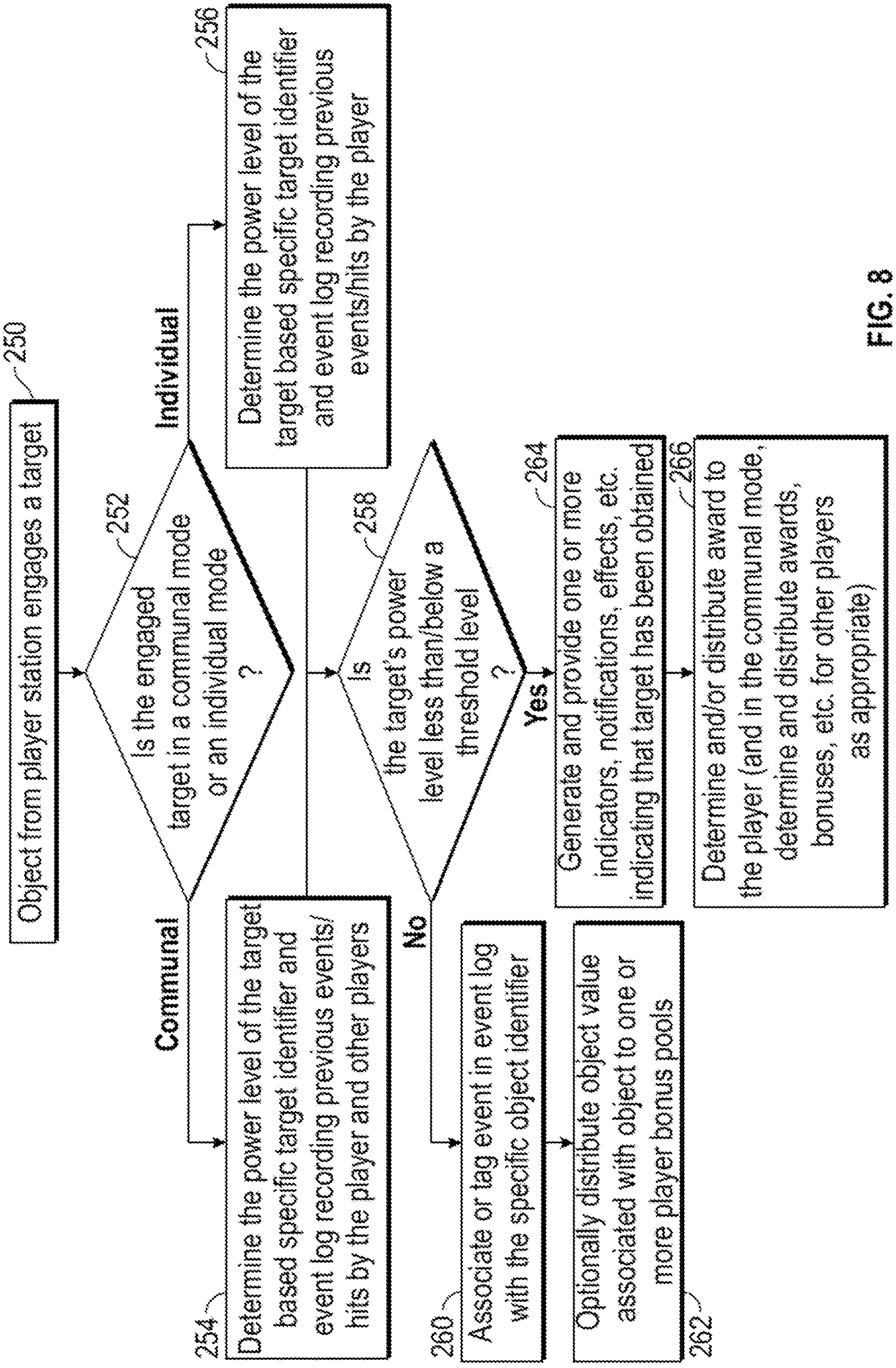
FIG. 8 shows a process flow diagram for targets set in communal or individual modes according to principles of the present disclosure.

FIG. 8 shows a process flow diagram for targets set in communal and individual modes according to principles of the present disclosure. As shown in FIG. 8, when an object engages/hits a target 108 of the plurality of targets moving about the playfield at 250, the amusement system 10 can determine whether the target is set or configured in a communal mode or an individual mode, as generally indicated at 252. System operators or administrators generally are able to set or update target settings/configurations to determine/set which targets 108 are in the communal or individual modes during game play. In some variations, all targets for a specific game or level may be set in the communal mode or the individual mode, or in other variations, one or more targets may be set in the communal mode and one or more targets may be set in the individual mode.

As indicated at 254, if the target engaged by the object is in the communal mode, the amusement system 10 determines the power level of the target based on a specific target identifier and an event log recording or otherwise including information related to previous events or hits of the target by the player at the player station 16 from which the object was directed, as well as information related to previous events or engagements by other players at the rest of the player stations 16 participating in the game. For example, the amusement system 10 can obtain information regarding target events/engagements from the event log using the specific target identifier, e.g., via look-up, cross-reference, etc. The event log, specific target identifiers, and/or other suitable information related thereto can be stored in the memories 66/73 or other memories or data stores in communication with the amusement system 10.

One the other hand, as indicated at 256, if the target engaged by the object is in the individual mode, the amusement system 10 determines the power level of the target based on its specific target identifier and an additional, player station event log recording or otherwise including the previous events/engagements by the player station 16 from which the object was directed. The additional event log can be part of the event log or can be a separate event log. For example, the amusement system 10 can include player station event logs that are assigned to each player station 16 for recording target events/hits related to the player station 16 to which the player station event logs are assigned. The player station event logs generally are stored in the respective player station memories 73, though the player station event logs can be stored in the memory 66 or other memories or data stores in communication with the amusement system 10.

FIG. 8 further shows that the amusement system 10 then determines whether the target's power is at or below a threshold level (as generally indicated at 258). If the target's power is not at or below the threshold level after being hit by the object (e.g., as determined based on the target's power level prior to being hit reduced by the object power value of the object hitting the target), the amusement system 10 logs, tags, or otherwise associates an event in the event log (in the communal mode) or the appropriate player station event log (in the individual mode) with the specific target identifier (at 260). Optionally, as indicated at 262, the amusement system 10 further can distribute portions of the object power value (and/or object cost amount) associated with the object to one or more player bonus pools.

If the target's power is at or below the threshold value, however, the amusement system 10 will generate and provide one or more indicators, notifications, effects, etc., indicating that the target has been captured or obtained, as indicated at 264. The amusement system 10 also determines and distributes the award or prize for obtaining/capturing the target to the player at the player station 16 that released the object (at 266). In the communal mode, the amusement system 10 may determine and distribute awards, bonuses, etc. for other players at player stations that directed objects that engaged the target, e.g., such as adding object power value bonuses to player bonus pools of, or accessible by, the other players who hit, but did not capture, the target.

The communal mode or other configuration setting or ruleset can be selected to allow the power level of the target to scale down hits in a way that prevents cherry-picking by other players, but still allows for accelerated capture. For example, in the communal mode, the player that captures the target gets the highest award, but other players that contributed to the capture also may get something (e.g., a reduced award or object power value bonus added to their player bonus pool). In one embodiment, in the communal mode, the percentage of the award may be distributed proportionately based on the amount contributed by each player, e.g., based on the number of objects and/or their object power values that hit the target. Also, there can be time-dependent award values, where a target awards the most when it is first spawned, then over time is worth less and less.

Furthermore, in some variations, awards or prizes also can be defined as ranges, with a minimum and maximum award that can be paid on any particular target obtainment or capture instance. The basic RTP of a target can be defined by a Power Level/Award value ratio. For example, a development tool can be used to first define RTPs, then set one of these values for each target, and the other value will automatically be set to obtain the RTP defined. The resulting output of the development tool can be a dataset stored on the amusement system 10, equivalent to a pay table or Award/Probability chart. It also may be compressed into a mathematical curve, e.g., to help to save space and increase obfuscation. A certain percentage of the spent amount on missed objects also can go into one or more player bonus pools. The player bonus pool(s) can be returned in multiple ways (e.g., Gold Rush Bonus, Free Game Plays/Player Directed Objects, etc.) to fund the higher valued targets, just like a progressive jackpot. In this way, the adjusted, limited-time scope of some high value targets can be higher than about 100%, about 200% or even up to about 5000%.

The skill-based game(s) further can include an award chart, listing, group, etc. that is stored and/or displayed by the amusement system 10. For example, the ranges of possible values for each target 108, and if enabled, even the average number of hits required to capture a target 108 can be displayed on the award chart, e.g., to help players to develop one or more game play strategies. In one embodiment, the award chart and other instructions and/or award information can be displayed on a per-player station menu that can be brought up using the player station controls (e.g., via menu button 44).

Generally, there will be no reflection of missed objects, i.e., objects will not reflect off the edges or other boundaries of the playfield 100, e.g., to substantially reduce, inhibit, or prevent the chance/occurrence of randomized hits. Furthermore, as discussed, players may receive an off-screen penalty if a shoot passes the edges/boundaries of the playfield 100. That is, an off-screen penalty is imposed if an object or objects fail to engage any targets 108 with in the playfield 100. In one embodiment, players may lose object power values as an off-screen penalty, e.g., 10% of an object power value infused in a missed object. This lost object power value may go to other player's a player bonus pool, e.g., represented as power vials on the playfield 100 (FIG. 6B/6C), that other players currently playing can obtain/access. Thus, players are incentivized to cause other players to miss or otherwise direct objects off screen. For instance, players might attempt to engage or capture a target right before another player's object reaches it, resulting in another player's objects going off screen, such that an off-screen penalty is imposed making object power values/object power value bonuses available to the other players.

According to embodiments of the present disclosure, the skill-based game(s) also allows for the selection of various object firing modes, e.g., an "Aim and Shoot" mode and a "Lock-on" mode. In an "Aim & Shoot" mode, each object can either hit a target or miss all targets and objects must "hit" targets to register damage or capture a target. That is, missed objects do not advance players towards an award or a prize, while engagements advance the player towards an award/prize, but the game can include 1 credit (e.g., $0.01, $0.10, $1.00, etc.), and mitigating circumstances or traps that can cause such advancement to be either limited (less than optimal) or almost completely in vain, for certain targets; e.g., a penalty target can appear and can be programmed to move in close proximity to other, particularly high value targets, and if hit, can penalize the player. Thus, by directing or aiming blindly, players will—over time—have a lower RTP experience.

In the "Aim Shoot" mode, completed objects are defined as plays, and are in the consideration phase until they strike a target or miss and go off-screen. If they strike a target, the play continues until the target is either captured or lost to another player (or the target times out). There is generally no requirement to shoot, and credits will stay on the system indefinitely, such that players have complete control of whether and when to shoot, or not to shoot, without penalty.

For missed objects in the "Aim & Shoot" mode, a fired object that misses all targets and sails off the edge of the screen is a lost opportunity. A less-than 100% RTP of the lost object's cost amount and/or object power value can be configured in the amusement system 10. A configuration setting can define the percentage of the object power value (or object/game play cost) to be added to the player bonus pool (e.g., a prescribed percentage, such as 50%, 80%, 90%, 95% or more can be added to the player bonus pool, with the remainder being collected by the amusement system 10). This affords the game system 10 the ability to penalize a player for not playing, as well as a mechanism to generate profit. Further, stolen awards can be provided and objects hitting a target deplete the target's power level.

Each target generally maintains a separate power level register for each player station 16. Information related to the power level registers can be stored in the respective player station memories 73, though information related to the power level registers can be stored in memory 66 or other memories or data stores in communication with the amusement system 10 without departing from the scope of the present disclosure. Each player station 16 further can be playing its own game, even if other players can aid in capturing a target, and only one player station can end up obtaining the award, so all the contributions from other players can go to their individual player bonus pools at up to 100% funding, depending on configuration settings. The skill-based game(s) further can provide an open loop, timed release spawning system, and targets that time-out and "disappear" can push all object contributions to the appropriate player bonus pools. In general, missed object costs are paid on the next capture of any target that triggers a bonus, but a portion may be contributed to progressive awards as well.

Figure 9A:
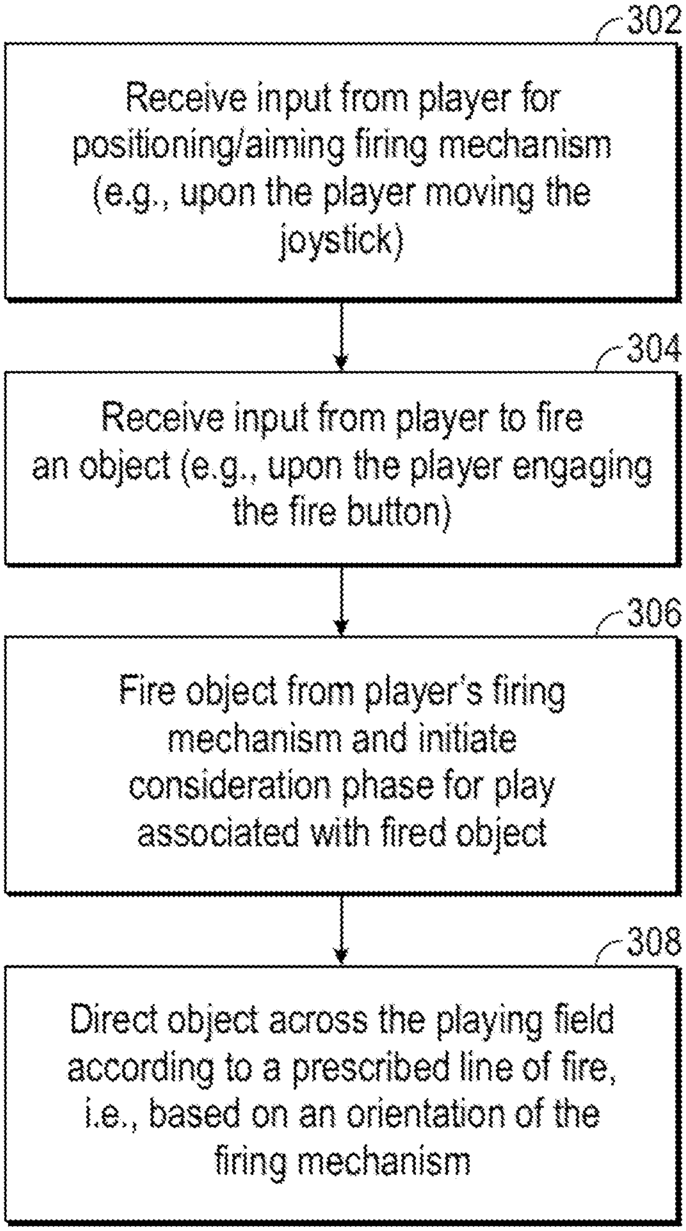
FIGS. 9A and 9B illustrate a process flow diagram for player directed objects in "Aim and Fire" and "Lock-on" modes, respectively, according to examples of the present disclosure.

FIG. 9A shows a process flow diagram for an object fired in the "Aim and Shoot" mode. As shown in FIG. 9A, in the "Aim and Shoot" mode, an input can be received from the player at a player station 16 for positioning/aiming the firing mechanism/turret 104 (e.g., upon the player moving or positioning the joystick 36), as generally indicated at 302. Thereafter, at 304, the amusement system 10 receives an input from the player to release/direct an object (e.g., upon the player engaging the fire/shoot button 40), and based thereon, the amusement system 10 will release or direct an object from the player's firing mechanism/turret 104 and initiate the consideration phase for a play associated with the object, as generally indicated at 306. The amusement system 10 will direct the object across the playfield 100 according to a prescribed line of fire, i.e., based on an angle or orientation of the turret 104 (at 308). The consideration phase will continue until the object hits a target or crosses a playfield boundary/goes off screen, upon which the consideration phase and that play related to the fired object is ended.

In a "Lock-on" mode, players can choose a particular target to fire at, e.g., players can select a target from a list or grouping of targets that includes all or a subset of the targets on the playfield, and objects can bypass all other targets hitting the selected target. As generally indicated in FIG. 6D, the selected target 108A can be shown in a window, popup screen, or other suitable images 120 adjacent the turret 104 on the playfield 100, and further, an indicator 122 providing a payout percentage of the selected target 108A can be shown next to the window. Players can choose the "Lock-on" mode so as to avoid having to manually aim at targets. Locking on to a target 108 does not automatically shoot at the selected target, and players must still manually select the fire button 40 to shoot. In this regard, in the "Lock-on" mode, players may be able to more easily shoot at the selected targets, by bypassing other targets not aimed at. Players can activate and deactivate "Lock-on" mode by engaging the one of the plurality of buttons, such as button 44. Furthermore, in "Lock-on" mode, players may be able to change or toggle between "locked-on" targets by engaging the joy stick 36, e.g., such as by pushing right or left on the joystick 36. Again, mitigating circumstances described in more detail below can make even a locked-on target unattainable, and any award value attained will be affected by timing choices made by the player. The list of available targets is selected to exclude the very low value targets.

Figure 9B:
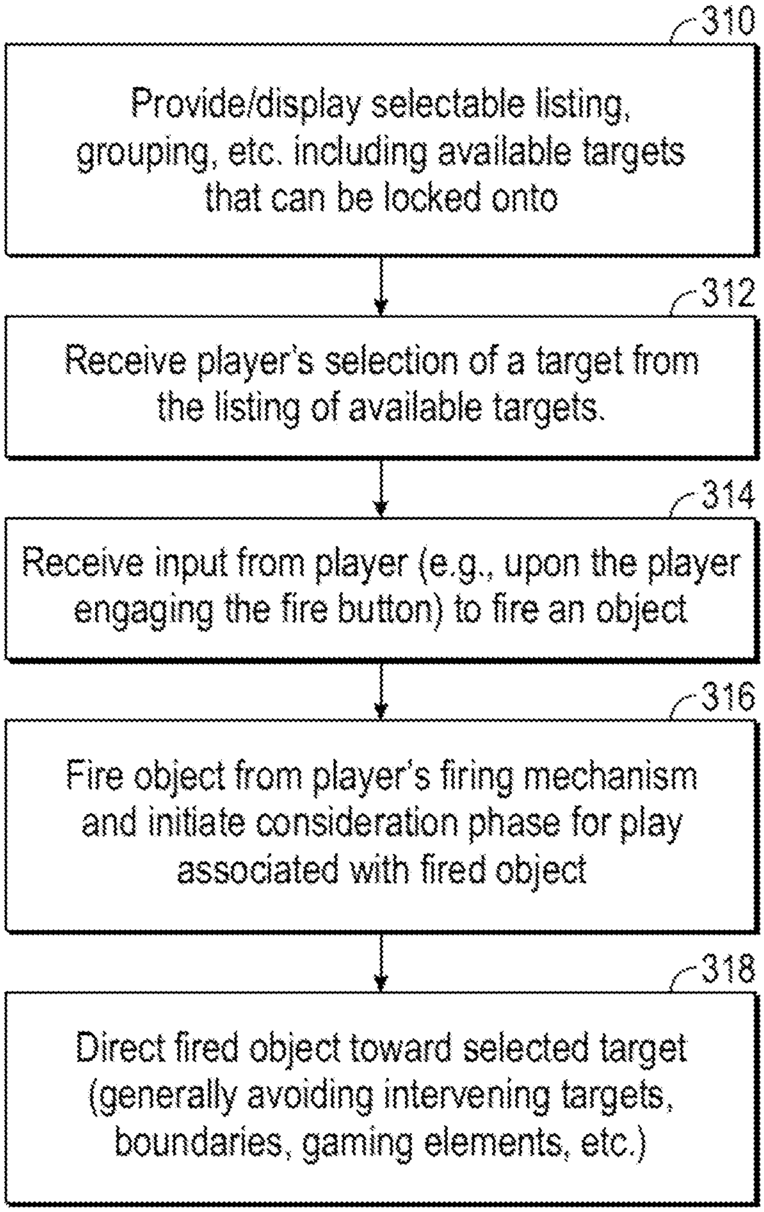

FIG. 9B shows a process flow diagram for an object in the "Lock-on" mode. As shown in FIG. 9B, when the "Lock-on" mode is selected, the amusement system 10 will display or otherwise provide a selectable listing, grouping, etc. of available targets that can be locked onto by a player (as indicated at 310). At 312, the amusement system 10 will receive a player's selection of a target from the listing of available targets, and at 314, the amusement system 10 can receive input from the player, e.g., upon the player engaging the fire button 40, to fire an object from the turret/firing mechanism 104. That is, in the "Lock-on" mode, there is no need for a player to aim or orient the turret to release/direct objects at the selected target. At 316, upon receiving the input from the player to fire an object, the amusement system 10 will release or direct an object from the player's firing mechanism 104 and initiate a consideration phase for a play associated with the fired object. Thereafter, at 318, the amusement system 10 will direct the object toward the selected target, and when the object hits the target, the consideration phase is ended and the play complete.

Generally, in the "Lock-on" mode, the amusement system 10 may guide or otherwise direct the object to avoid intervening targets, boundaries, other gaming elements, etc. In one embodiment, the fired object will not be allowed to hit other targets, boundaries, etc., and will always engage the selected target when the "Lock-on" mode is selected. In this regard, players have the option to bypass lower-valued targets clogging the path and only lock on to high value targets. The primary effect of this is to add volatility to the game, making awards much rarer and awards much higher in value each time a target is captured. However, in alternative variations, the object may not be guided or directed to always avoid intervening targets, boundaries, etc. and it may be possible for an object fired in the "Lock-on" mode to hit boundaries, other targets, etc. in its path towards the selected target.

The amusement system 10 also can allow for the selection of and "Auto Fire" mode. If enabled, "Auto Fire" allows players to hold down the shoot/fire button 40 to automatically fire shoots at a prescribed rate. This rate can be slightly slower than the maximum rate a player could shoot by rapidly tapping the shoot/fire button 40; however, the rate can be adjustable by system operators/administrators and can be set to faster or slower rates, without departing from the scope of the present disclosure.

The skill-based game(s) further include a feature matching mode where awards are provided, targets are obtained, etc. based on feature similarities between objects fired and targets hit. In one embodiment, the features can include a color of the objects and the targets, though other features of the targets and objects, such as visual appearance, signature sounds, size, movement patterns, etc., or other distinct or recognizable audio or visual features associated therewith can be used without departing from the scope of the present disclosure. In one embodiment, targets 108 will be rendered according to a specific color, and when an object of that same or similar color engages the target 108, a feature match award bonus can be added for that target. Each player station further can include a feature match award bonus register, so a target will have enough changes in features to match the different stations. When the feature does not match, but is close, a lesser percentage of the max that could be, can be added. The farther away the feature is from matching the target, the less of a bonus percentage is added, down to zero added for colors that do not meet a prescribed threshold of similarity. In this regard, the feature matching mode can provide a way to get a minimum RTP (e.g., of 105% or more) of cash played over time. In some instances, it can be required that a high percentage of objects be matching to get the feature match bonus awards that push the RTP over 100%, and further a certain number of hours of play may be required to achieve a greater than 100% RTP via feature matching.

Figure 10:
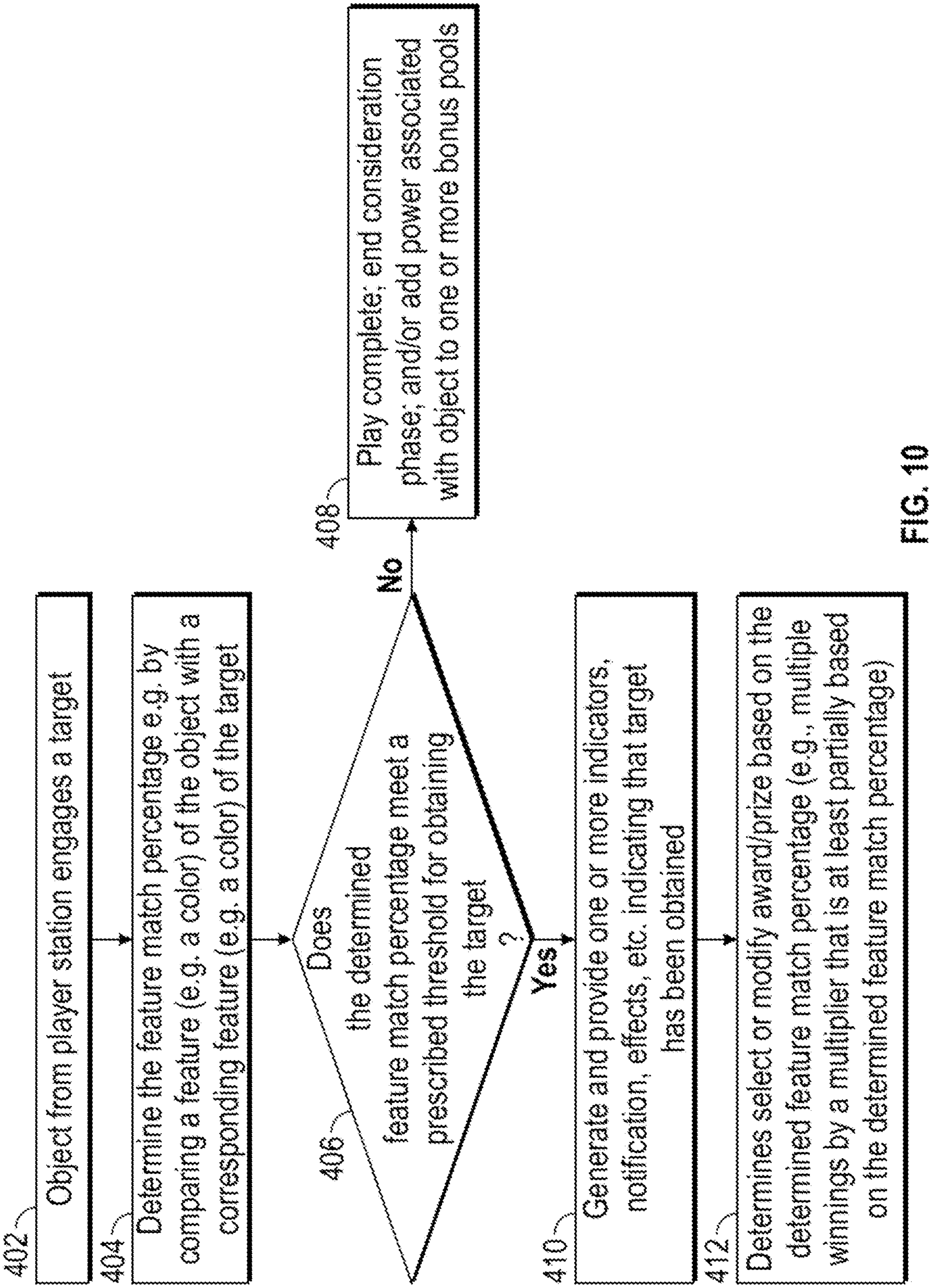
FIG. 10 shows a process flow diagram for a feature matching mode according to principles of the present disclosure.

FIG. 10 shows a process flow diagram for a feature matching mode. As shown in FIG. 10, in the feature matching mode, when an object from one of the player stations 16 engages a target as indicated at 402, the amusement system 10 determines the feature, e.g., color, match percentage of the object and the target as indicated at 404. For example, the feature match percentage of the collision can be calculated by comparing the color of the object and the color of the target. For instance, if at the moment of impact, the target is purple and the object is purple, there is a 100% feature match. If the object is yellow, on the other hand, there is a 0% feature match. The farther apart the object color is from the target color, e.g., on the color spectrum, the smaller the feature match.

Thereafter, at 406, the amusement system 10 determines whether the feature match percentage meets a prescribed threshold, e.g., about 50%, about 60%, about 70%, about 75%, about 80%, about 90%, about 95%, etc., for obtaining the target or otherwise providing an award or bonus for engaging the target. If the feature match percentage does not meet the prescribed threshold, the play for that object is complete, and the amusement system 10 may collect the player's play cost and/or adds object power values and/or portions of the cost associated with that object to one or more player bonus pools, as indicated at 408.

However, as indicated at 410, if the determined feature match percentage meets the prescribed threshold, the amusement system 10 generates and provides one or more indicators, notifications, effects, etc. indicating that the target has been obtained/captured. Thereafter, at 410, the amusement system 10 optionally can determine or select a monetary award or prize based on the determined feature match percentage at 412. More specifically, the amusement system 10 can multiply the award by a multiplier that is at least partially based on the determined feature match percentage.

Players only may be able to capture some targets if the object's features are substantially similar or the same as the target's, e.g., a feature match percentage of at least 70%, which can make the strategy for capturing some targets slightly more complicated than strategies for capturing other targets. However, in additional or alternative embodiments, capturing or obtaining a particular target can be independent of the feature match percentage, but the feature match percentage can be used to determine the target's award, e.g., the award for obtaining the target can be scaled based on the feature match percentage. That is, the feature match percentage of a collision/engagement can determine a player's reward for a target captured. For example, if an object is red at the moment that it collides with a purple target, as red and purple are fairly close to each other on the color spectrum, this will be a 70% match, and this percentage, i.e., 70%, can be multiplied by the reward for a given target. That is, for a target with a reward range from about 10× to about 30×, 70% feature match will mean that the reward when the target is captured will be 70% of the distance between 10× and 30×, so 24× in one embodiment. In this example, if a player is spending 5 cents per object, the player will win $0.05×24=$1.20 when the player captures the target. If the target is captured via a feature match streak as discussed below, however, the reward higher be higher.

In some embodiments, one or more targets may be configured to be captured using a feature match streak. That is, one or more targets can be captured when they are hit with a certain number of consecutive objects that have a prescribed feature match percentage, such as a 4, 5, 6, 7, or 8 or more match streak on a particular target, with each consecutive object's feature match being about 60% to about 80% or more. Furthermore, a specific indicator might be generated upon impact of the object, with the target to indicate that certain object qualifies for a feature match streak. For example, if an object qualifies for the feature match streak, a specific visual or audio indicator can be provided, such as visuals and audio associated with an explosion, a shockwave, or other unique visual and/or audio indicator. When a player completes a feature match streak, that player further can be rewarded with a specific reward, such as specialized digital tokens or coins, and also a specific guaranteed return, such as about 1.1× to about 6× the total dollar amount spent for objects directed at the target.

Additionally, players further may be able to steal or hijack another player's feature match streak. That is, if in the middle of building a feature match streak, if another player hits that same target with an about 60% to an about 80% feature match or more, that player can hijack the other player's active feature match streak. In this regard, one effective strategy could be to wait for other players to start a feature match streak and then try to swoop to steal the target, such that the active streak can be taken and completed with a fewer number of objects. Also, in the event that a player fails to complete a streak, or the streak gets hijacked by another player, the player still may have an opportunity to capture the target, if the player has accrued a certain amount of object enhancements on their turret 104.

In a "feature-cycle matching mode," features, e.g., a color, of the objects can be continuously or dynamically changed, e.g., a rainbow cycling of objects can be provided according to a learnable sequence or pattern. In one embodiment, the color of a player's turret 104, the color of an indicator, such as an energy ball, associated with the turret 104, and/or the color of objects fired from the turret 104, may all constantly/dynamically change, in tandem, such as in a repeating pattern of colors. That is, the turret 104 and objects fired therefrom can change color according to a prescribed or otherwise set, non-changing sequence over time to allow players to learn or anticipate the color changes. In this regard, feature cycle matching thus establishes another way for a player to raise award values and thus RTP through the exercise of advanced skill techniques.

In one embodiment, a configuration option or setting can be selected to define whether the player station-specific feature match award bonus register is an accumulator which adds the feature matches of all objects from the player station 16 engaging the target 108, and approaches the max award value only when all objects are perfect matches; or is a one-value register, in which only the very final object needed to capture the target 108 is evaluated to determine the feature match award bonus multiplier value. The relationship between the percentage of minimum and maximum feature match and minimum and maximum award bonus further can be managed by a curve that can be linear or nonlinear, which can be defined by a configuration option or setting of the amusement system.

Furthermore, in some embodiments, enabling a "Auto Fire" mode, as discussed above, can remove a player's ability to time objects for an optimum feature match that may be required to maintain a better than 100% RTP. That does not mean, however, that players will not have the ability to feature match or to get large awards; it just means that over a long period of time, a player's average return may be lower than other player who properly time objects for maximum feature match.

According to embodiments of the present disclosure, the plurality of targets 108 on the playfield 100 can include various different target types. These targets further can have different shapes, sizes, appearances, and/or configurations; move or be directed according to different, recognizable/identifiable paths or trajectories; have specific sounds or audio outputs associated therewith; or have other suitable unique or recognizable/identifiable features or aspects. Each of the plurality of targets further can be associated with different meta-games or sub-games defined by game instructions or rules stored in memory (e.g., memory 66 or 73) and accessible by the players at the player stations 16. To improve strategy, players generally should be knowledgeable about the different target types and can obtain information on targets by accessing gaming menus.

In one embodiment, the plurality or targets can include one or more time-limited targets (also referred to as a "follow me" targets) displayed and moved across the playfield 100. Each time-limited target is assigned a specific duty cycle of appearance. That is, the time-limited targets may be on the screen for select time intervals during game play, e.g., on-screen from 100% of the time to a lesser percentage of time, such as 75%, 50%, 30% or less. In one embodiment, the default interval of time-limited targets can be about every 30 minutes. When engaged by a single object, the time-limited target can award a minimum of about 1× or more the amount of the object that captured the time-limited target. For a perfect feature match, the time-limited target awards 1× plus the minimum amount possible to get as close to about 105% as possible. For example, if a time-limited target object cost is a penny, a penny can be added, making the award 2× or 200%. For a dime object with a perfect match, a penny added would be 110%. If the object cost is $1.00, then a nickel can be added to get to 105%. Since a player is not forced to shoot, players can wait patiently for the opportunity to only shoot time-limited targets. In this regard, players are guaranteed a minimum 100% return and can get up to a 200% return, if playing with penny objects (as defined by the operator's setting of the minimum object cost). The time-limited target generally is not included in the listing, grouping, etc. of selectable targets displayed in the "Lock-on" mode, and the "Aim and Shoot" mode generally must be used to capture time-limited targets. The time-limited targets can have a specific appearance, such as a specific color, e.g., silver, gold, etc., shape, size, and/or configuration, to denote its special nature and to help players find it easily on-screen.

The plurality of targets 108 can also include one or more object power bonus targets. The object power bonus targets be hit or captured to increase a player's object power levels. In one embodiment, object power bonus targets may only provide object power increases for a short period of time, e.g., for about 3 to about 10 seconds or more after the target enters the playfield 100, before transforming to a state that does not provide object power increases. Thus, it can be beneficial to the first player to catch/hit one as soon as it appears onscreen. Catching such an object power bonus target will reward the player with a prescribed amount for a player bonus pool, e.g., as indicated in vials (FIGS. 6B and 6C). The wise use of object power provides a tool in the player's arsenal for gaining advantage over other players. The order of initial object power values can be determined from a preset list. Players also can increase object power values by maximizing feature match on objects.

The plurality of targets 108 further can include one or more time-based, high value targets that may provide a higher return on the amount spent per object. These time-based, high value targets may only provide a higher return for a limited time period. That is, they require fast reflexes, as they are only in their valuable (and vulnerable) form for a prescribed time period, such as 3 seconds though other time periods, such as 10 seconds, 30 seconds, or more can be used without departing from the scope of the present disclosure. After the time period lapses, these targets transform to a less valuable (and more durable) form. If a player manages to shoot such a time-based, high value target before any other players, while it is still in the more valuable form, the player may be guaranteed to win between about 1.1× and about 5× the object cost or more (e.g., depending on the current cost-per-object setting of the player's turret 104). Furthermore, to capture such a target the object may have to have a feature match of 60% to 80% or more. For example, the time-based, high value targets can be associated with one or more timers and awards for the time-based, high value targets can be determined based on an amount of time remaining on the one or more timers.

Figure 11:
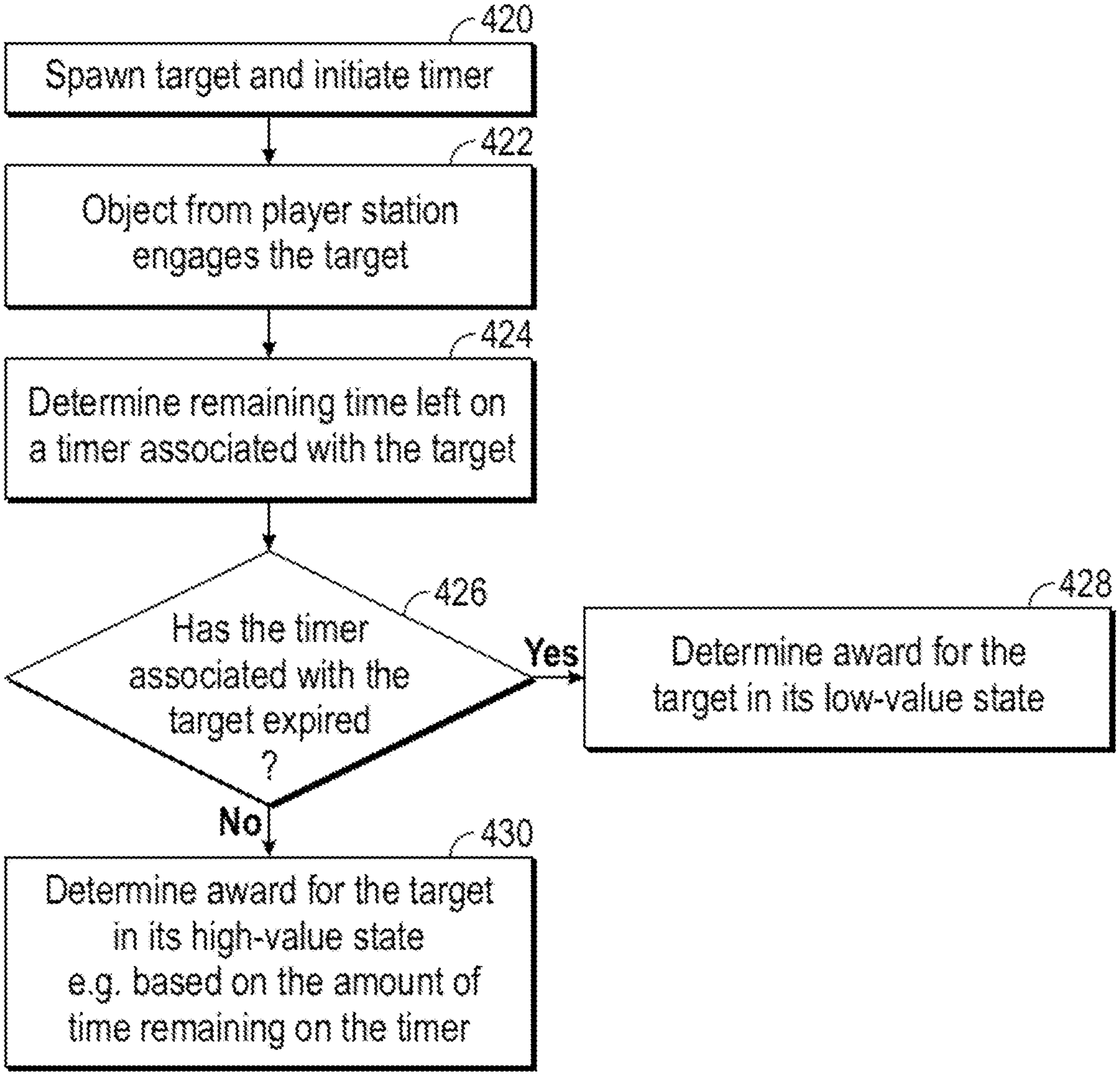
FIG. 11 shows a process flow diagram for a time-based, high value target according to one example of the present disclosure.

FIG. 11 shows a process flow diagram for a time-based, high value target. For example, as indicate at 420, the amusement system 10 can spawn the target and initiate a timer associated with the target. When a player's object engages/hits target as indicated at 422, the amusement system 10 will determine the remaining time left on the timer associated therewith (at 424). If the timer has expired as determined at 426, the amusement system 10 can collect all of the player's object cost, or optionally can determine an award/prize and/or object power bonus for the target in a low-value state (as indicated at 428). If the timer has not expired, however, the amusement system 10 can determine a high-value award/prize for obtaining the target, and optionally can scale this award/prize based on an amount of time remaining on the timer (at 430).

The plurality of targets 108 also can include one or more one-hit targets. Players astute enough to be the first one to spot one of these one-hit targets can capture it with a single object from their turret 104, and award more than the cost of the object, e.g., about 1.1× to about 6.0× or more. It also generally does not matter what color the object is at the moment it collides with the one-hit target, as long as the player is the first to hit it, they are guaranteed to win more than spent. In one embodiment, the award can include the cost of the object plus a minimum of 4%, 5%, 6%, 7% or up to 10% or more. In some embodiments, players that capture one-hit targets can win up to about 6× what was spent, as well as object power increases, bonuses, etc. One-hit targets may have a unique appearance or have one or more unique sound effects associated therewith. In one embodiment, one hit targets can have a signature/unique screaming sound that is played, at least once or periodically, while the one-hit target moves across or about the playfield 100.

The plurality of targets 108 also can include at least one big money or jackpot targets, which can provide large awards based on pre-funding from progressive bonus pools, e.g., a target-specific Progressive Value Target ("PVT") pool, and/or award rakes from all players. For example, not only can a portion of costs for all missed objects be applied to the target-specific Progressive Value Target ("PVT") pool, but a portion of all direct objects from all players on the target itself can go to fund the award value, which can be enabled or disabled via configuration settings. An alternative configuration can shave a percentage of all awards from all players, as a rake to fund the PVT. These jackpot targets can present a challenge, but may provide an increased player reward to the person with the patience and dedication to capture them. Like a deer hunter in a blind, capturing these targets may require a long time of waiting and watching. Such targets can only be captured after many objects, such as 200, 300, or more of objects. In this regard, the best strategy is to keep track of how many other players have object the jackpot target, and then swoop in at the end and to win the reward. The minimum award value for the jackpot targets can be shown onscreen, viewable to all players. For example, the reward range for such a target can appear when a player is locked onto the jackpot target in the "Lock-on" mode, to indicate how much a player stands to win from "capturing" the target normally (either via a feature match streak or maximizing the turret's infused object values). A jackpot target can have a specific shape, appearance or configuration recognizable to players, and in one embodiment, a jackpot target 150 can be significantly larger than other targets on the playfield 100 (FIG. 6A). Furthermore, in some embodiments, only one jackpot target maybe displayed on the playfield 100 at a time—that is, another jackpot target will not appear until the jackpot target is captured/obtained.

The plurality of targets 108 further can include one or more free game play targets. Instead of monetary awards/prizes, capturing free game play targets earns one or more free objects. The free objects earned can fill object power value levels with approximately the equivalent object power as a player spent capturing the free object target. Capturing free game play targets can be an effective strategy because for good feature matches on landed objects, a player can end up earning more object power from the free game plays than they started with. Further, if a player is trying to capture the free game play target via a feature match streak, but is unsuccessful, the player may have another attempt with the free plays earned. Still further, capturing a free game play target is an effective strategy to convert, increase or spread out object power bonuses (e.g., similar to getting change for a dollar in the form of 20 nickels), and players can then use these low object value free objects on riskier maneuvers, such as trying to steal targets from other players to force them to shoot off screen.

Further, the plurality of targets 108 can include one or more object power ups. When players capture this target, instead of awards/prizes, they earn object value power ups. More specifically, players can consolidate a bunch of smaller value objects into one highly enhanced object, i.e., to increase the object value of a single object. Strategically, this is another great way to quickly clear the playfield of targets, causing other players' objects to go off screen to the shooting player's own benefit. This reward is somewhat the opposite of the free object reward, in that rather than getting a change for a dollar, it's like converting nickels into a dollar bill.

Further still, the plurality of targets 108 can include one or more penalty targets that penalize players if captured/hit. That is, if a player's object collides with one of these penalty targets 104, the player's turret 104 might be disabled for a prescribed time period, such a number of seconds or longer. Additionally, or in the alternative, a player can incur an object power loss or penalty if they shoot one of these targets, e.g., as further punishment, 50% of a player's object total available object power can be stripped away and distributed to other players currently playing, e.g., to one or more player bonus pools. So, in addition to avoiding shooting these penalty targets, players might try to trick other players into shooting them, in order to increase their own object value levels, increasing the level of skill/strategy during game play. Players also can do this by trying to capture a target that another player is shooting, resulting in that player's objects engaging a penalty target instead.

Other types of targets of the plurality of targets 108 can include rush targets, such as ruby rush, gold rush, and/or lightning rush targets. These targets can have a significantly higher reward range than average targets, meaning players will win a higher reward for capturing them via a feature match streak or otherwise. For these specialized targets, players may need to infuse their turret with more object value to capture them in comparison with other targets. Players further may receive a reward for these targets according to a specific sequence. This sequence also can have an added bonus of capturing other targets on the screen, which can be a good way to trip up other players into shooting off screen, thereby increasing a player's object enhancement level.

According to embodiments of the present disclosure, hidden or specialized functions can be learned by players that take the time to review the rules or instructions. For example, if a player does not fire an object or change object cost for a prescribed time period, e.g., several seconds or more, a player maybe be able to access a special object that can be fired from the turret 104. The special object generally will emerge from next to the player's turret, grow in size and value, then shrink and diminish before leaving the screen after a certain amount of time. The goal is to wait after the launch until the special object is at its largest and longest. Players may be able to unlock hidden or specialized functions based on specific control sequences, gaming events, etc. When the special object is at its largest, it awards more than the cost of the object that destroyed it. In one embodiment, the maximum award is usually 104% of the object cost.

Figure 12:
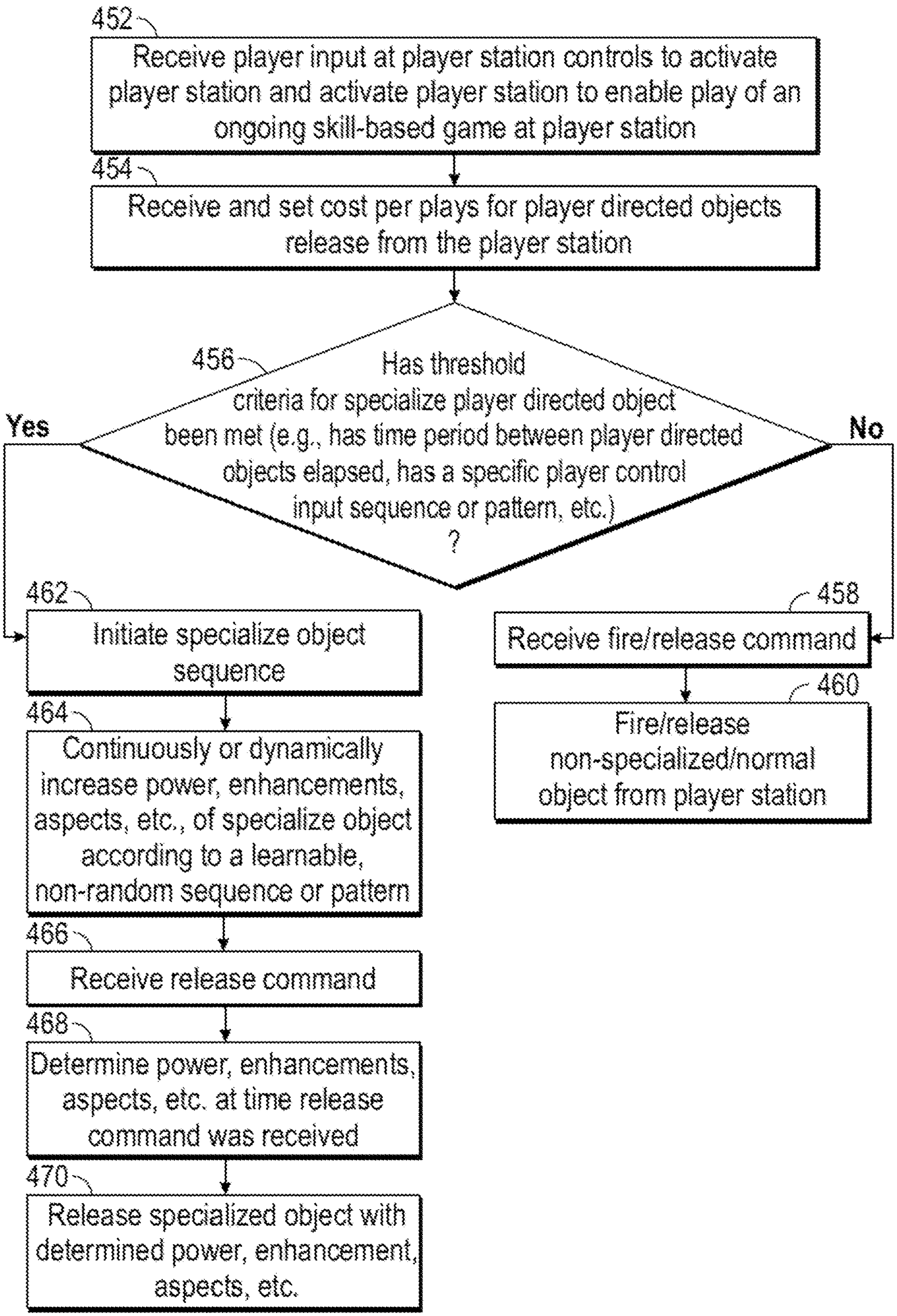
FIG. 12 shows a process flow diagram for activating a specialized object according to one example of the present disclosure.

FIG. 12 shows an exemplary process flow for a specialized object. As indicated at 452, the system 10 may receive an input form player station controls of one of the player stations 16 to activate the player station to enable play of an ongoing skill-based game. At 454, the system 10 can received and set a cost per play for player directed objects released from the player station 16.

At 456, it can be determined whether the threshold criterion has been met for a specialized player directed object—for example, whether a predefined time period between player directed objects has elapsed, the player has engaged the player controls according to a specific, specialized sequence or pattern, or combinations thereof.

If the threshold criterion has not been met and the system 10 receives a command to release/direct the player direct object (at 458), the system 10 will direct/release a regular, i.e., non-specialized player directed object, across the playfield 100 from the player station 16 (at 460).

However, if the threshold criterion has been met, the system 10 will initial a specialize object sequence (at 462), and continuously and/or dynamically increase object power level, enhancements, aspects, etc., of the specialized object according to a learnable, non-random sequence or pattern (at 464). Further, when the system 10 receives a command to release/direct the player direct object (at 466), the system 10 will determine the power value, enhancements, aspects, etc., at the time the release/fire command was received (at 468) and release the specialized object with the determined power value, enhancements, aspects, etc.

The foregoing description generally illustrates and describes various embodiments of the present invention. It will, however, be understood by those skilled in the art that various changes and modifications can be made to the above-discussed construction of the present invention without departing from the spirit and scope of the invention as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present invention. It therefore will be understood by those skilled in the art that while the present invention has been described above with reference to preferred embodiments, numerous variations, modifications, and additions can be made thereto without departing from the spirit and scope of the present invention as set forth in the following claims. Accordingly, various features and characteristics of the present invention as discussed herein may be selectively interchanged and applied to other illustrated and non-illustrated embodiments of the invention, and numerous variations, modifications, and additions further can be made thereto without departing from the spirit and scope of the present invention as set forth in the appended claims.

The invention claimed is:

1. A skill-based amusement system, comprising:

a display;

at least one player station having one or more player controls configured to control one or more selected actions for play of a skill-based game presented on the display, a control system in communication with the at least one player station, the control system including a memory and one or more processors configured to execute a plurality of instructions stored in the memory to:

present a plurality of targets each moving across a playfield shown on the display based on selected instructions stored in the memory;

wherein the plurality of targets comprises a series of different targets, each moving in a non-randomized movement along a substantially identifiable path or trajectory;

receive one or more game play inputs from the one or more player controls of the at least one player station, and direct one or more objects across the playfield in a movement responsive to the one or more game play inputs; and wherein a player at the at least one player station is enabled to use strategy or skill to direct objects at one or more targets of the plurality of targets moving across the playfield to achieve a return to the player greater than 100% of a play amount or level input by the player upon capturing at least one engaged target of the one or more targets in accordance with game rules or instructions associated with the at least one engaged target;

wherein, responsive to a target being engaged by the one or more objects, the engaged target is moved along a secondary, non-random predictable path that is independent from the substantially identifiable path or trajectory, and wherein responsive to the engaged target being engaged by one or more additional objects, the engaged target is moved along an additional, non-random, predictable path or returned to the substantially identifiable path or trajectory.

2. The skill-based amusement system of claim 1, wherein one or more of the targets of the plurality of targets are associated with a meta or sub-game defined by a series of meta or sub-game instructions or rules stored in the memory and accessible by the player at the at least one player station; and wherein the plurality of instructions includes instructions configured to initiate a meta or sub-game associated with the one or more targets when the one or more targets are engaged, and determine whether the at least one player station has obtained an award based on game rules or instructions related to the meta or sub-game associated with the one or more targets.

3. The skill-based amusement system of claim 1, wherein at least some of the targets of the plurality of targets have a higher difficulty of obtainment than other targets of the plurality of targets.

4. The skill-based amusement system of claim 3, wherein the targets with the higher difficulty of obtainment are configured to provide higher award values than targets with a lower difficulty of obtainment.

5. The skill-based amusement system of claim 1, wherein the plurality of instructions includes instructions configured to determine whether a threshold criterion for obtaining or capturing one or more engaged targets has been met, and if the threshold criterion has been met, initiate a predetermined audio or visual sequence associated with obtainment or capture of the one or more engaged targets and distribute an award to the at least one player station.

6. The skill-based amusement system of claim 5, wherein the threshold criterion requires a power value associated with the one or more engaged targets to be at or below a predetermined threshold value and a power value associated with the one or more objects to equal or be greater than a predefined threshold value for obtaining the one or more engaged targets.

7. The skill-based amusement system of claim 6, wherein the series of different targets are each part of a predefined target class of a plurality of predefined target classes, and wherein the power value associated with the one or more objects is determined based on power values awarded for previously engaged targets that are part of a predefined target class including the one or more engaged targets.

8. The skill-based amusement system of claim 1, wherein the plurality of instructions includes instructions configured to provide a power value associated with the one or more objects, and to modify the power value based upon a volatility enhancement script adapted to modify the power value associated with the one or more objects overtime according to recognizable or memorizable patterns or sequences.

9. The skill-based amusement system of claim 1, wherein the one or more player controls of the at least one player station comprise a series of buttons assignable to one of a series of game play actions, and a magnetic joy stick configured to facilitate directing of the one or more objects about the playfield.

10. The skill-based amusement system of claim 1, wherein the at least one player station further comprises a monetary interface.

11. The skill-based amusement system of claim 1, wherein each of the targets is spawned onto the playfield according to prescribed target spawning sequences based on instructions configured to control a quantity of targets and a mix of target types on the playfield.

12. A method for operation of a skill-based amusement system, comprising:

presenting a plurality of identifiable targets moving about a playfield shown on a display associated with the skill-based amusement system, directing movement of each target about the playfield in a substantially non-random, substantially predictable trajectory or path based on instructions stored in a memory, wherein one or more of the targets are associated with one or more different meta or sub-games each defined by a series of game instructions or rules stored in a memory associated with the skill-based amusement system and accessible by a player of the skill- based amusement system;

receiving one or more game play input signals from one or more player controls of an active player station, and in response, directing one or more objects toward one or more targets moving about the playfield;

wherein a player at the active player station is enabled to use strategy or skill to direct the one or more objects at select ones of the targets; and if at least one target is engaged by the one or more objects, determining whether the active player station should receive an award based on game rules or instructions associated with the at least one target engaged by the one or more objects, to achieve a return to player of greater than 100% of a play amount or level input by the player at the active player station upon capturing or obtaining the at least one target in accordance with the game rules or instructions associated with the at least one target;

wherein, responsive to a target being engaged by the one or more objects, the engaged target is moved along a secondary, non-random predictable path that is independent from the substantially non-random, substantially predictable path or trajectory, and wherein responsive to the engaged target being engaged by one or more additional objects, the engaged target is moved along an additional, non-random, predictable path or returned to the substantially non-random, substantially predictable path or trajectory.

13. The method of claim 12, further comprising determining whether a threshold criterion for obtaining or capturing the at least one target has been met to determine whether the active player station should receive the award, and if the threshold criterion has been met, initiating a predetermined audio or visual sequence associated with obtainment or capture of one or more engaged targets and distributing the award to at least one active player station.

14. The method of claim 13, wherein the threshold criterion requires a power value associated with the one or more objects to equal or be greater than a predefined threshold value for obtaining the one or more engaged targets.

15. The method of claim 14, further comprising modifying the power value associated with the one or more objects based on a volatility enhancement script that increases and/or decreases the power value associated with the one or more objects over time according to recognizable or memorizable patterns that generally repeat over time.

16. A skill-based amusement system, comprising:

a cabinet including a display adapted to display a playfield of a skill-based game, and a plurality of player stations linked to the display, each of the player stations having a plurality of player controls; and one or more game control systems, each including at least one processor configured to access and execute gaming logic instructions stored in at least one memory to cause the amusement system to:

move a plurality of targets about the playfield according to one or more substantially non-random sequences or patterns, at least some of the targets comprising targets having different sizes, configurations, types, classes, colors, or combinations thereof;

receive player selected play options for one or more game plays of the skill-based game from at least one active player station of the plurality of player stations;

receive a selection of a cost for a play of the skill-based game from the at least one active player station;

upon receipt of an input responsive to operation of one or more of the plurality of player controls of the at least one active player station, initiating a game play of the skill-based game and directing an object along the playfield from the at least one active player station toward the plurality of targets;

if the object engages a target, determine whether a threshold criterion for obtaining the target has been met during the game play;

change a feature associated with objects during selected game plays;

determine a feature match by comparing the features of the objects fired to a feature of the target; and if a feature match percentage is at or above a predetermined threshold, providing an award or a bonus to the at least one active player station from which the object was directed.

17. The skill-based amusement system of claim 16, wherein the amusement system distributes an award to the at least one active player station if the threshold criterion for obtaining the target is met.

18. The skill-based amusement system of claim 16, wherein the threshold criterion requires a power value associated with the one or more objects to equal or be greater than a predefined threshold value for obtaining the target.

19. The skill-based amusement system of claim 16, wherein the plurality of player controls of each player station comprises a series of buttons assignable to one of a series of game play actions, and a joy stick that facilitates player direction of the object along the playfield.

20. The skill-based amusement system of claim 16, wherein each player station further includes a bill accepter and a printer.

21. The skill-based amusement system of claim 16, further comprising sound and lighting features that are activated in response to occurrence of events during play of the skill-based game.

22. The skill-based amusement system of claim 16, wherein one or more targets of the plurality of targets are configured as communal targets for engagement by multiple players for a communal mode game play, and wherein the amusement system further comprises instructions executed by the one or more processors to:

determine a power level of each communal target based on a specific target identifier and an event log that records engagements by each player station from which each object engaging the communal target was directed and target engagements by other player stations participating in the communal mode game play; and if the power level of the target is at or below a threshold level, generate an indicator to indicate that the target has been obtained, and determine an award for the player station that obtained the target.

23. The skill-based amusement system of claim 16, wherein one or more targets are configured as individual mode targets, and wherein the amusement system is configured to:

determine a power level of the target based on a target identifier and an event log that records engagements by the player station from which an object engaging the target was directed; and if the power level of the target is at or below a threshold level, generate an indicator to indicate that the target has been obtained, and determine an award to be provided to the at least one active player station from which the object was directed.

24. The skill-based amusement system of claim 16, wherein the amusement system further comprises one or more instructions configured to determine an award for obtainment of the target based on an amount of time remaining on a timer associated with the target.

25. The skill-based amusement system of claim 16, wherein the skill-based game is subdivided into multiple levels each including unique features, a theme, one or more level-specific targets, special power-ups, and combinations thereof.

26. A method for play of a skill-based game, comprising:

presenting a plurality of differently identifiable targets on a playfield shown on a display of an amusement system;

moving or directing each of the targets about the playfield in accordance with a non-random, identifiable sequence or pattern of movement;

setting one or more player selected play options for at least one game play of the skill-based game at one or more player stations;

upon receipt of an input from one or more of a plurality of a player controls of the one or more player stations, initiating a play of the skill-based game, including directing one or more objects at one or more of the targets moving across the playfield from the one or more player stations;

if an object engages a target, determining whether a threshold criterion for obtaining an award for the target has been met;

changing a color of an indicator associated with the object;

determining a feature match percentage by comparing a current color of the object, when the object engages the target, to a color of the indicator; and if the feature match percentage is at or above a predetermined threshold, providing a bonus to a player station from which the object was directed;

wherein a player of the skill-based game is enabled to increase the award obtained through application of skill during the play of the skill-based game according to a series of player accessible game rules or instructions for the skill-based game by recognizing the sequence or pattern of movement of targets and engaging targets with increased award values or bonus values associated therewith.

27. The method of claim 26, further comprising determining whether a power level of the target is at or below a threshold value for obtaining the target.

28. The method of claim 26, wherein the object includes a prescribed object value that is deducted from a power level of the target when the object engages the target to determine whether the power level of the target is at or below the threshold value for obtaining the target.

29. The method of claim 28, further comprising: determining the power level of the target based on a specific target identifier and an event log that records engagements by a player station from which the object was directed and hits by other player stations participating in the skill-based game; and if the power level of the target is at or below a threshold level, generating an indicator to indicate that the target has been obtained, and determining awards to be provided to the player station from which the object was directed and additional player stations that directed one or more objects that engaged the target.

30. The method of claim 28, further comprising: determining the power level of the target based on a specific target identifier and an event log that records engagements by a player station from which the object was directed; and if the power level of the target is at or below a threshold level, generating an indicator to indicate that the target has been obtained, and determining an award to be provided to the player station from which the object was directed.

* * * * *